US011197232B2

(12) United States Patent
Ryu et al.

(10) Patent No.: US 11,197,232 B2
(45) Date of Patent: Dec. 7, 2021

(54) LOCATION REPORTING HANDLING

(71) Applicant: Ofinno, LLC, Reston, VA (US)

(72) Inventors: Jinsook Ryu, Herndon, VA (US);
Esmael Dinan, McLean, VA (US);
Kyungmin Park, Vienna, VA (US);
Peyman Talebi Fard, Sterling, VA (US); Weihua Qiao, Herndon, VA (US); Jayshree Bharatia, Plano, TX (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 16/837,377

(22) Filed: Apr. 1, 2020

(65) Prior Publication Data

US 2020/0314731 A1 Oct. 1, 2020

Related U.S. Application Data

(60) Provisional application No. 62/827,771, filed on Apr. 1, 2019.

(51) Int. Cl.
*H04W 48/08* (2009.01)
*H04W 64/00* (2009.01)

(52) U.S. Cl.
CPC ......... *H04W 48/08* (2013.01); *H04W 64/003* (2013.01)

(58) Field of Classification Search
CPC ..... H04W 24/02; H04W 48/00; H04W 72/04; H04W 76/11; H04W 8/18; H04W 48/08; H04W 48/12; H04W 64/003; H04W 76/12; H04W 76/27; H04W 4/06; H04W 8/20

See application file for complete search history.

(56) References Cited

U.S. PATENT DOCUMENTS

| 2019/0261260 | A1* | 8/2019 | Dao | H04W 48/18 |
| 2020/0245235 | A1* | 7/2020 | Chun | H04W 48/18 |
| 2020/0314701 | A1* | 10/2020 | Talebi Fard | H04W 36/0033 |
| 2020/0314732 | A1* | 10/2020 | Park | H04W 76/11 |
| 2020/0344576 | A1* | 10/2020 | Li | H04W 4/06 |
| 2021/0092707 | A1* | 3/2021 | Ryu | H04W 8/24 |
| 2021/0092708 | A1* | 3/2021 | Ryu | H04W 68/02 |

(Continued)

OTHER PUBLICATIONS

3GPP TS 23.401 V15.6.0 (Dec. 2018); Technical Specification; 3rd Generation Partnership Project; Technical Specification Group Services and System Aspects; General Packet Radio Service (GPRS) enhancements for Evolved Universal Terrestrial Radio Access Network (E-UTRAN) access (Release 15).

(Continued)

*Primary Examiner* — Jean A Gelin
(74) *Attorney, Agent, or Firm* — Sachin T. Kandhari; Philip R. Smith; Jacob L. Mangan

(57) ABSTRACT

An access and mobility management function (AMF) receives, from a network function, an event exposure subscribe message requesting to notify a change of closed access group (CAG) area of a wireless device. The AMF sends, to a base station, a location reporting control message requesting to notify the change of the CAG area of the wireless device. The location reporting control message comprises a list of CAG identifiers. The AMF receives, from a second base station, a location report message notifying the change of the CAG area. The AMF sends, to the network function, an event exposure notify message indicating the change of the CAG area.

20 Claims, 31 Drawing Sheets

(56) References Cited

U.S. PATENT DOCUMENTS

2021/0092725 A1* 3/2021 Park ..................... H04W 92/12
2021/0184875 A1* 6/2021 Qiao ..................... H04W 76/18

OTHER PUBLICATIONS

3GPP TS 23.501 V15.4.0 (Dec. 2018); Technical Specification; 3rd Generation Partnership Project; Technical Specification Group Services and System Aspects; System Architecture for the 5G System; Stage 2; (Release 15).

3GPP TS 23.502 V15.4.1 (Jan. 2019); Technical Specification; 3rd Generation Partnership Project; Technical Specification Group Services and System Aspects; Procedures for the 5G System; Stage 2; (Release 15).

3GPP TR 23.734 V16.01.0 (20189-0312); Technical Report; 3rd Generation Partnership Project; Technical Specification Group Services and System Aspects; Study on enhancement of 5GS for Vertical and LAN Services (Release 16).

3GPP TR 23.743 V1.1.0 (Jan. 2019); Technical Report; 3rd Generation Partnership Project; Technical Specification Group Services and System Aspects; Study on optimisations of UE radio capability signalling (Release 16).

3GPP TS 29.518 V15.2.0 (Dec. 2018); Technical Specification; 3rd Generation Partnership Project; Technical Specification Group Core Network and Terminals; 5G System; Access and Mobility Management Services; Stage 3 (Release 15).

3GPP TS 36.413 V15.4.0 (Dec. 2018); Technical Specification; 3rd Generation Partnership Project; Technical Specification Group Radio Access Network; Evolved Universal Terrestrial Radio Access Network(E-UTRAN);S1 Application Protocol (S1AP) (Release 15).

3GPP TS 36.423 V15.4.0 (Dec. 2018); Technical Specification; 3rd Generation Partnership Project; Technical Specification Group Radio Access Network; Evolved Universal Terrestrial Radio Access Network(E-UTRAN); X2 application protocol (X2AP); (Release 15).

3GPP TS 38.300 V15.4.0 (Dec. 2018); Technical Specification; 3rd Generation Partnership Project; Technical Specification Group Radio Access Network; NR; NR and NG-RAN Overall Description; Stage 2; (Release 15).

3GPP TS 38.331 V15.4.0 (Dec. 2018); Technical Specification; 3rd Generation Partnership Project; Technical Specification Group Radio Access Network; NR; Radio Resource Control (RRC) protocol specification; (Release 15).

3GPP TS 38.401 V15.4.0 (Dec. 2018); Technical Specification; 3rd Generation Partnership Project; Technical Specification Group Radio Access Network; NG-RAN; Architecture description; (Release 15).

3GPP TS 38.413 V15.2.0 (Dec. 2018); Technical Specification; 3rd Generation Partnership Project; Technical Specification Group Radio Access Network; NG-RAN; NG Application Protocol (NGAP); (Release 15).

3GPP TS 38.423 V15.2.0 (Dec. 2018); Technical Specification; 3rd Generation Partnership Project; Technical Specification Group Radio Access Network; NG-RAN; Xn application protocol (XnAP); (Release 15).

R2-1900071_S2-1813392; 3GPP TSG RAN WG2#105; Athens, Greece, Feb. 25-Mar. 1, 2019; SA WG2 Meeting #S2-129bisS2-1813392; Nov. 26-30, 2018, West Palm Beach, USA(revision of S2-181xxxx).

R2-1900072_S2-1813393; 3GPP TSG RAN WG2#105; Athens, Greece, Feb. 25-Mar. 1, 2019; SA WG2 Meeting #S2-129bisS2-1813393; Nov. 26-30, 2018, West Palm Beach, USA(revision of S2-181xxxx).

R2-1900408—RAN2 aspects of Non-Public Networks (NPN); 3GPP TSG-RAN WG2 #105Tdoc; Athens, Greece, Feb. 25-Mar. 1, 2019; Agenda Item: 11.7.2.4; Source: Ericsson; Title:RAN2-aspects of Non-Public Networks (NPN).

R2-1900409—Draft Reply LS on RAN Impact analysis due to NPN; 3GPP TSG-RAN WG2#105Tdoc; Athens, Greece, Feb. 25-Mar. 1, 2019; Title:Draft Reply LS on RAN Impact analysis due to NPN; Release:Release 16.

R2-1900760—NPN_Solution1_v02.DOCX3GPP TSG RAN WG2 Meeting #105; Athens, Greece, Feb. 25-Mar. 1, 2019; Agenda ltem:11.13; Source: Intel Corporation; Title:RAN2 impact on Non-Public Network Deployment using SNPN.

R2-1900761—NPN_Solution2_v02.DOCX3GPP TSG RAN WG2 Meeting #105; Athens, Greece, Feb. 25-Mar. 1, 2019 ; Agenda ltem:11.13; Source: Intel Corporation; Title:RAN2 impacton Non-Public Network Deployment using CAG.

R2-1901444 Impact analysis of NPN support; 3GPP TSG-RAN WG2 #105; Athens, Greece, Feb. 25-Mar. 1, 2019; Agenda ltem:11.7.1; Source: Huawei, HiSilicon; Title: Impact analysis of NPN support.

R2-1901445 Reply LS on RAN Impact analysis due to NPN; 3GPP TSG-RAN WG2 #105; Athens, Greece, Feb. 25-Mar. 1, 2019; Title:[DRAFT ] Reply LS on RAN Impact analysis due to NPN; Response to:S2-1813393; Release:Rel-16.

R2-1901805 RAN2 impacts of NPN; 3GPP TSG-RAN WG2 Meeting #105; Athens, Greece, Feb. 25-Mar. 1, 2019; Agenda item:11.7.1; Source:Qualcomm Incorporated; Title:RAN2 impacts of Non-public Networks (NPN) work in SA2.

R2-1902716 Reply LS on RAN Impact analysis due to NPN; 3GPP TSG-RAN WG2 #105; Athens, Greece, Feb. 25-Mar. 1, 2019; Title:Reply LS on RAN Impact analysis due to NPN; Response to:R2-1900072/S2-1813393; Release: Rel-16.

S2-1901391_was01330_was01110_was00122_VLAN-23501-merged-QC-PH; 3GPP TSG-SA WG2 Meeting #130; 1 Jan. 21-25, Kochi, India; CR-Form-v11.1; Change Request.

S2-1902810_was02676_was01575_CAG-23502; 3GPP TSG-SA WG2 Meeting #131 S2-1902810; Feb. 25-Mar. 1, 2019, Tenerife, Spain; CR-Form-v11.4; Change Request.

S2-1902812_was_S2-1902808_was_S2-1902674_was_S2-1902101_v4; 3GPPTSG-SA2 Meeting #131S2-1902812; Santa Cruz—Tenerife, Spain, Feb. 25, 2019-Mar. 1, 2019; CR-Form-v11.4; Change Request.

S2-1902849_was2844_was2722_was2104_5GLAN_23501_CR_general_aspects_v4; 3GPP TSG-SA WG2 Meeting #130; 9Santa Cruz, Tenerife, Spain, Feb. 25-Mar. 1, 2019 (revision of S2-192844); CR-Form-v11.4; Change Request.

S2-1902898_was02809_was02675_was01574_was1391_VLAN-23501-CAG; 3GPP TSG-SA WG2 Meeting #131 ;8 Feb. 25-Mar. 1, 2019, Tenerife, Spain[rev of S2-1902809]; CR-Form-v11.1; Change Request.

* cited by examiner

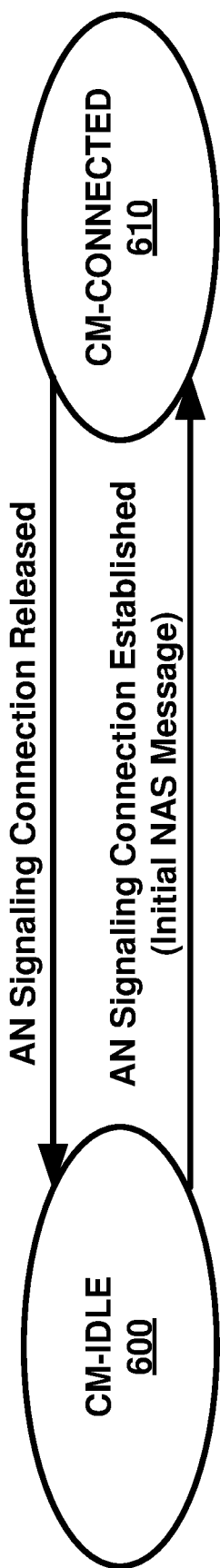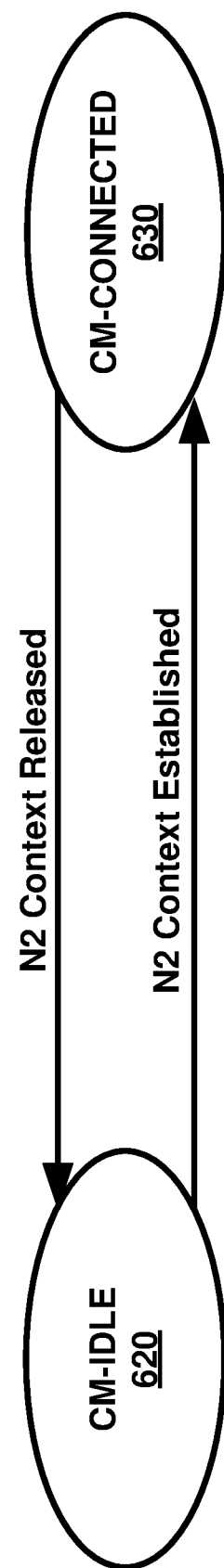

Call flow for RRC state transition

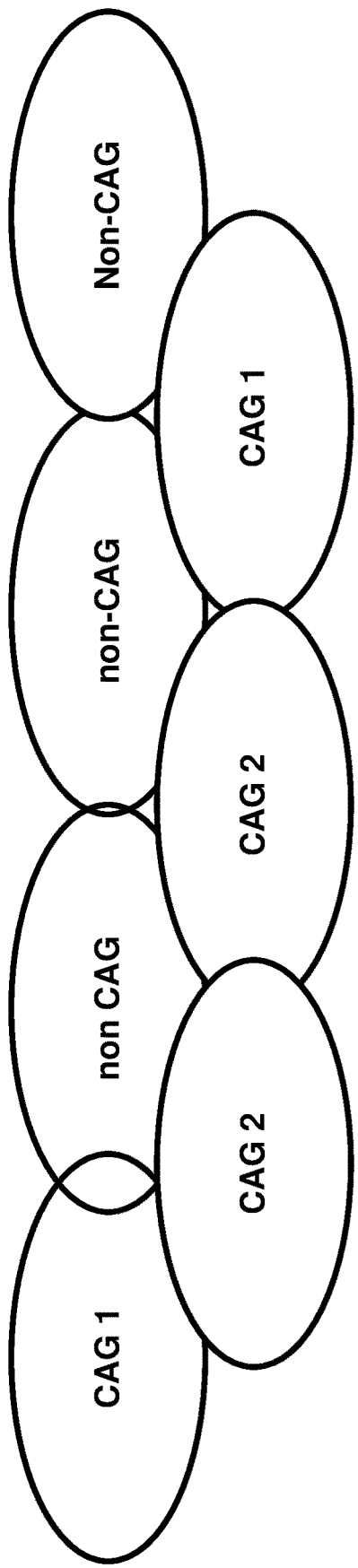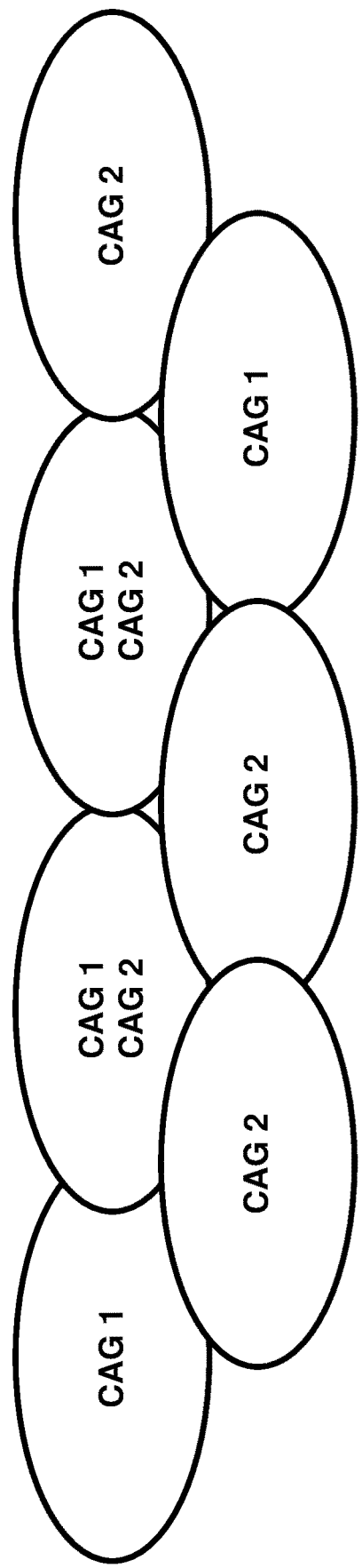
FIG. 19A
FIG. 19B

LOCATION REPORTING HANDLING

CROSS-REFERENCE TO RELATED APPLICATIONS

This application claims the benefit of U.S. Provisional Application No. 62/827,771, filed Apr. 1, 2019, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 6A and FIG. 6B depict two connection management state models in UE 100 and AMF 155 as per an aspect of embodiments of the present disclosure.

FIG. 19A is an example deployment diagram for closed access group (CAG).

FIG. 19B is another example deployment diagram for closed access group (CAG).

DETAILED DESCRIPTION OF EMBODIMENTS

Example embodiments of the present invention enable implementation of enhanced features and functionalities in 4G/5G systems. Embodiments of the technology disclosed herein may be employed in the technical field of 4G/5G systems and network slicing for communication systems. More particularly, the embodiments of the technology disclosed herein may relate to 5G core network and 5G systems for network slicing in communication systems. Throughout the present disclosure, UE, wireless device, and mobile device are used interchangeably.

Figure 1:
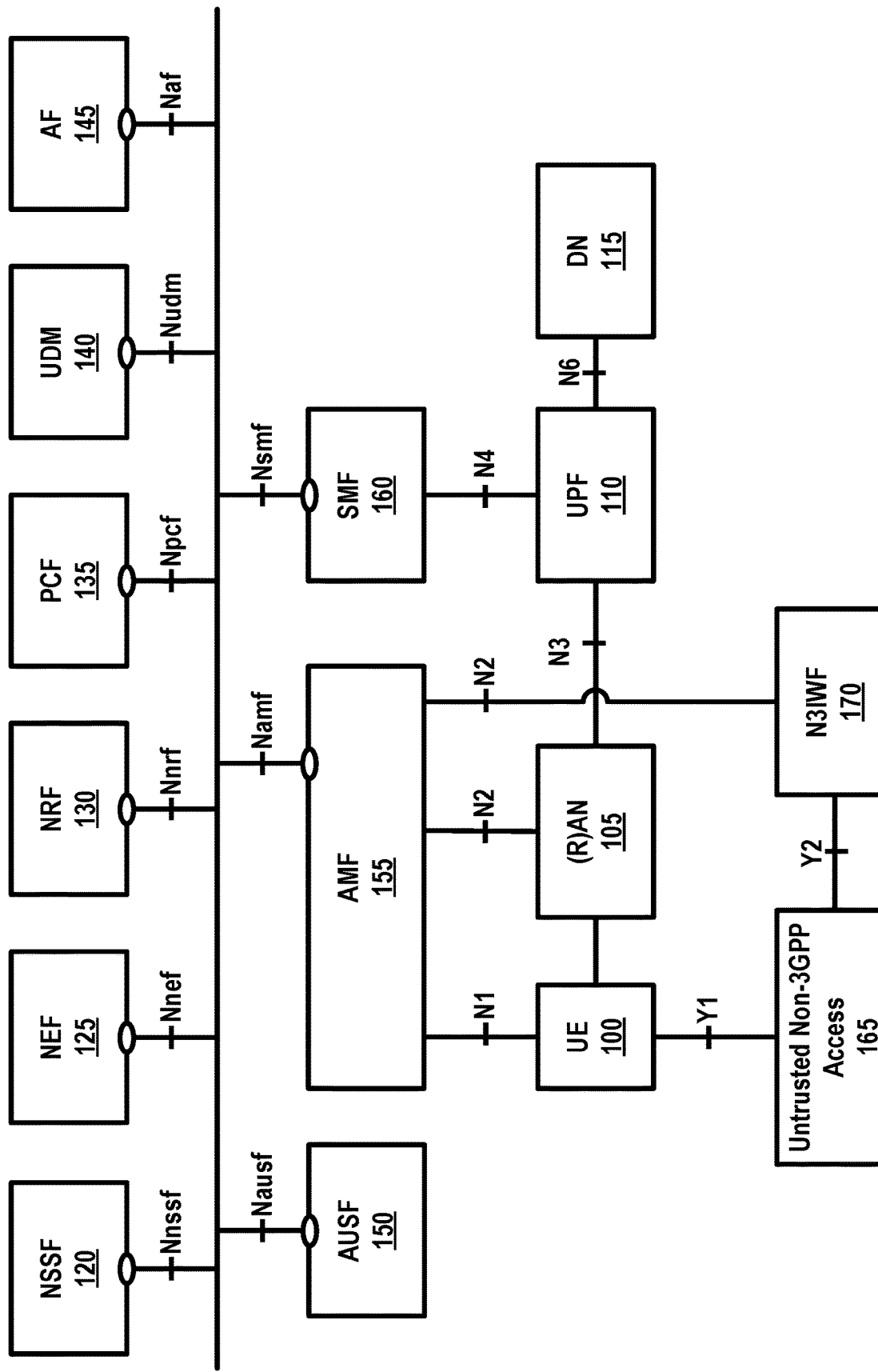
FIG. 1 is a diagram of an example 5G system architecture as per an aspect of an embodiment of the present disclosure.
Figure 2:
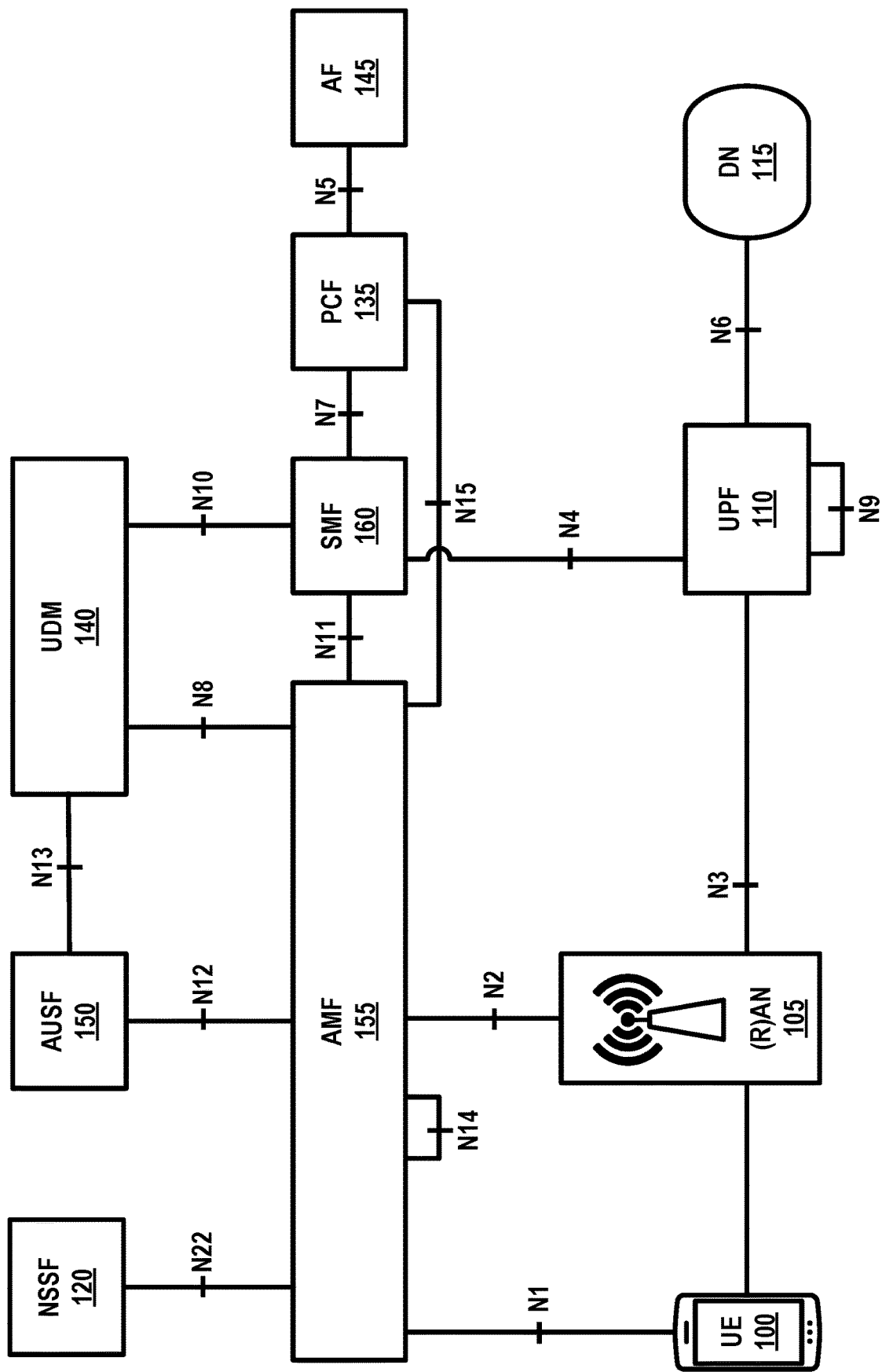
FIG. 2 is a diagram of an example 5G System architecture as per an aspect of an embodiment of the present disclosure.

The following acronyms are used throughout the present disclosure:

5G 5th generation mobile networks
5GC 5G Core Network
5GS 5G System
5G-AN 5G Access Network
5QI 5G QoS Indicator
ACK Acknowledgement
AF Application Function
AMF Access and Mobility Management Function
AN Access Network
CDR Charging Data Record
CCNF Common Control Network Functions
CIoT Cellular IoT
CN Core Network
CP Control Plane
DDN Downlink Data Notification
DL Downlink
DN Data Network
DNN Data Network Name
DRX Discontinuous Reception
F-TEID Fully Qualified TEID
gNB next generation Node B
GPSI Generic Public Subscription Identifier
GTP GPRS Tunneling Protocol
GUTI Globally Unique Temporary Identifier
HPLMN Home Public Land Mobile Network
IMSI International Mobile Subscriber Identity
LADN Local Area Data Network
LI Lawful Intercept
MEI Mobile Equipment Identifier
MICO Mobile Initiated Connection Only MME Mobility Management Entity
MO Mobile Originated
MSISDN Mobile Subscriber ISDN
MT Mobile Terminating
N3IWF Non-3GPP InterWorking Function
NAI Network Access Identifier
NAS Non-Access Stratum
NB-IoT Narrow Band IoT
NEF Network Exposure Function
NF Network Function
NGAP Next Generation Application Protocol
NR New Radio
NRF Network Repository Function
NSI Network Slice Instance
NSSAI Network Slice Selection Assistance Information
NSSF Network Slice Selection Function
OCS Online Charging System
OFCS Offline Charging System
PCF Policy Control Function
PDU Packet/Protocol Data Unit
PEI Permanent Equipment Identifier
PLMN Public Land Mobile Network
PRACH Physical Random Access CHannel
RAN Radio Access Network
QFI QoS Flow Identity
RM Registration Management
S1-AP S1 Application Protocol
SBA Service Based Architecture
SEA Security Anchor Function
SCM Security Context Management
SI System Information
SIB System Information Block
SMF Session Management Function
SMS Short Message Service
SMSF SMS Function
S-NSSAI Single Network Slice Selection Assistance information
SUCI Served User Correlation ID
SUPI Subscriber Permanent Identifier
TEID Tunnel Endpoint Identifier
UE User Equipment
UL Uplink
UL CL Uplink Classifier
UPF User Plane Function
VPLMN Visited Public Land Mobile Network Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
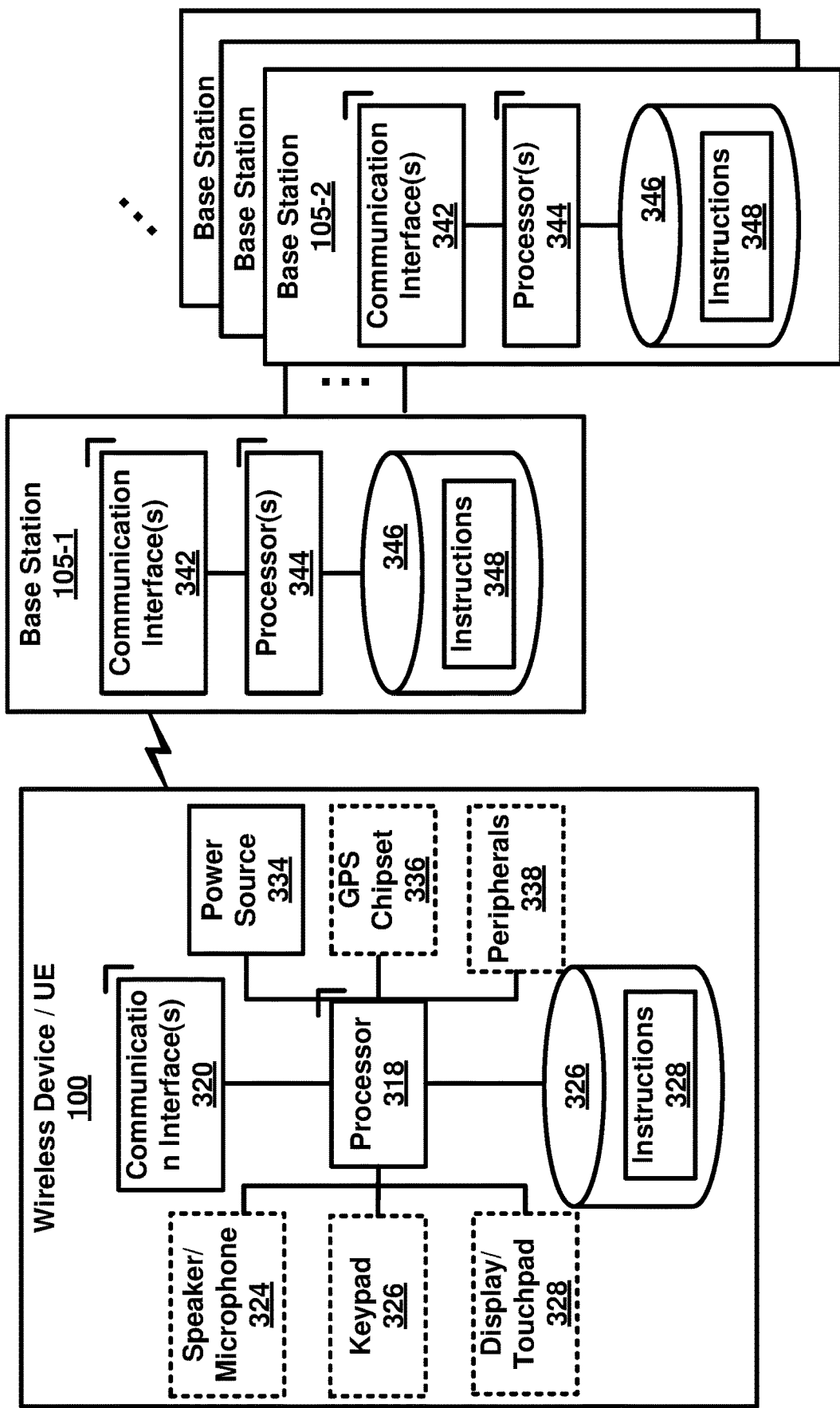
FIG. 3 is a system diagram of an example wireless device and a network node in a 5G system as per an aspect of an embodiment of the present disclosure.
Figure 4:
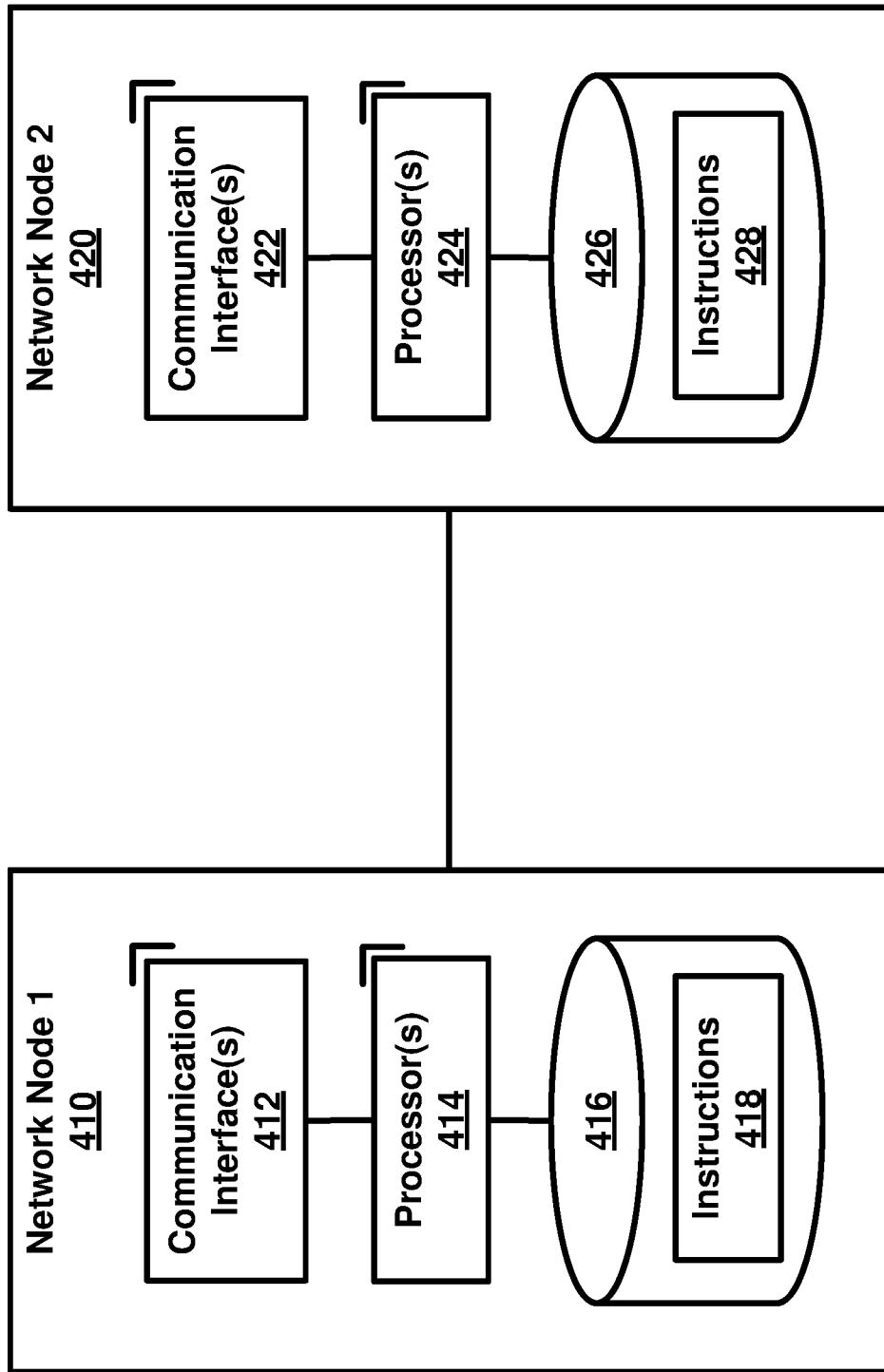
FIG. 4 is a system diagram of an example wireless device as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, an network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(s) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function (AF), AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

Figure 5A:
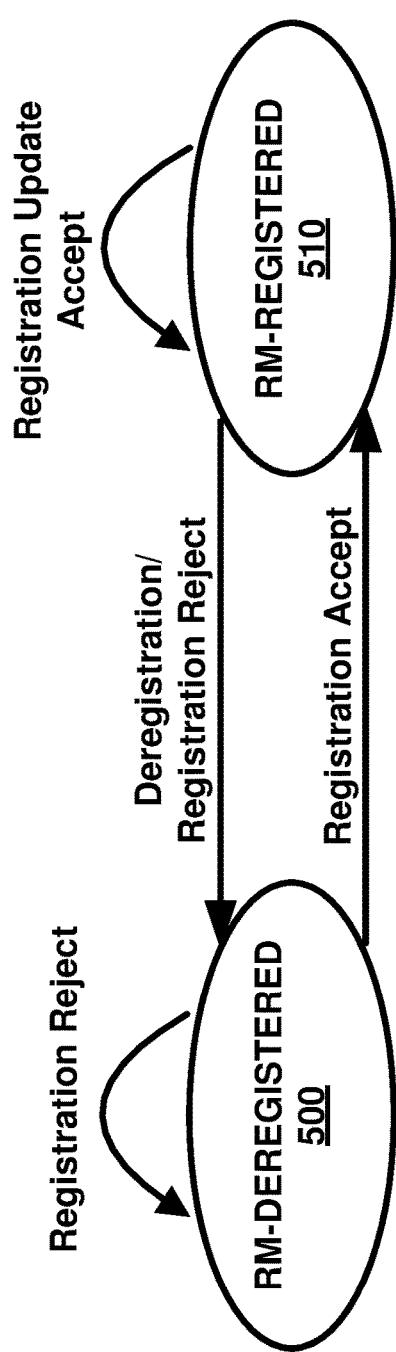
FIG. 5A and FIG. 5B depict two registration management state models in UE 100 and AMF 155 as per an aspect of embodiments of the present disclosure.
Figure 5B:
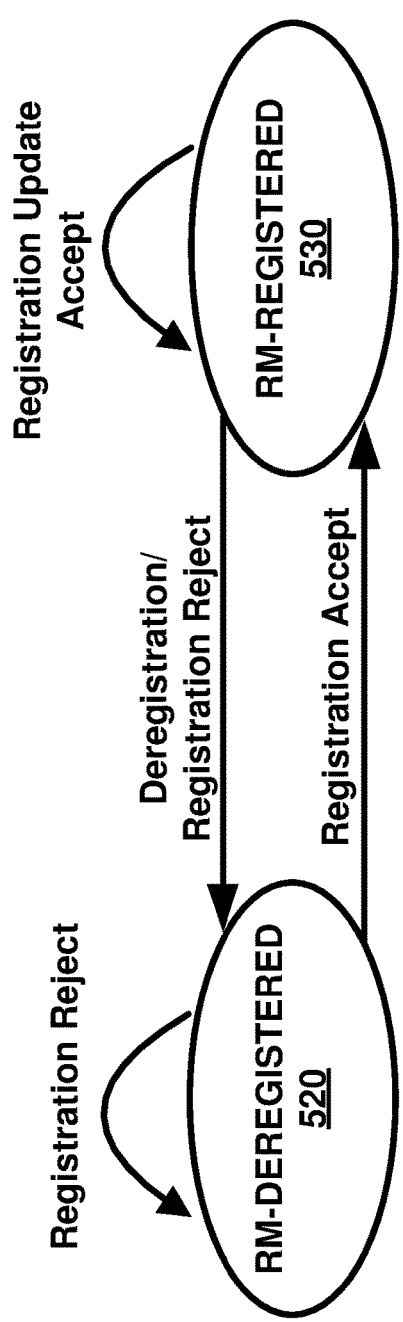

In an example, as depicted in example FIG. 5A and FIG. 5B, the registration management, RM may be employed to register or de-register a UE/user 100 with the network and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
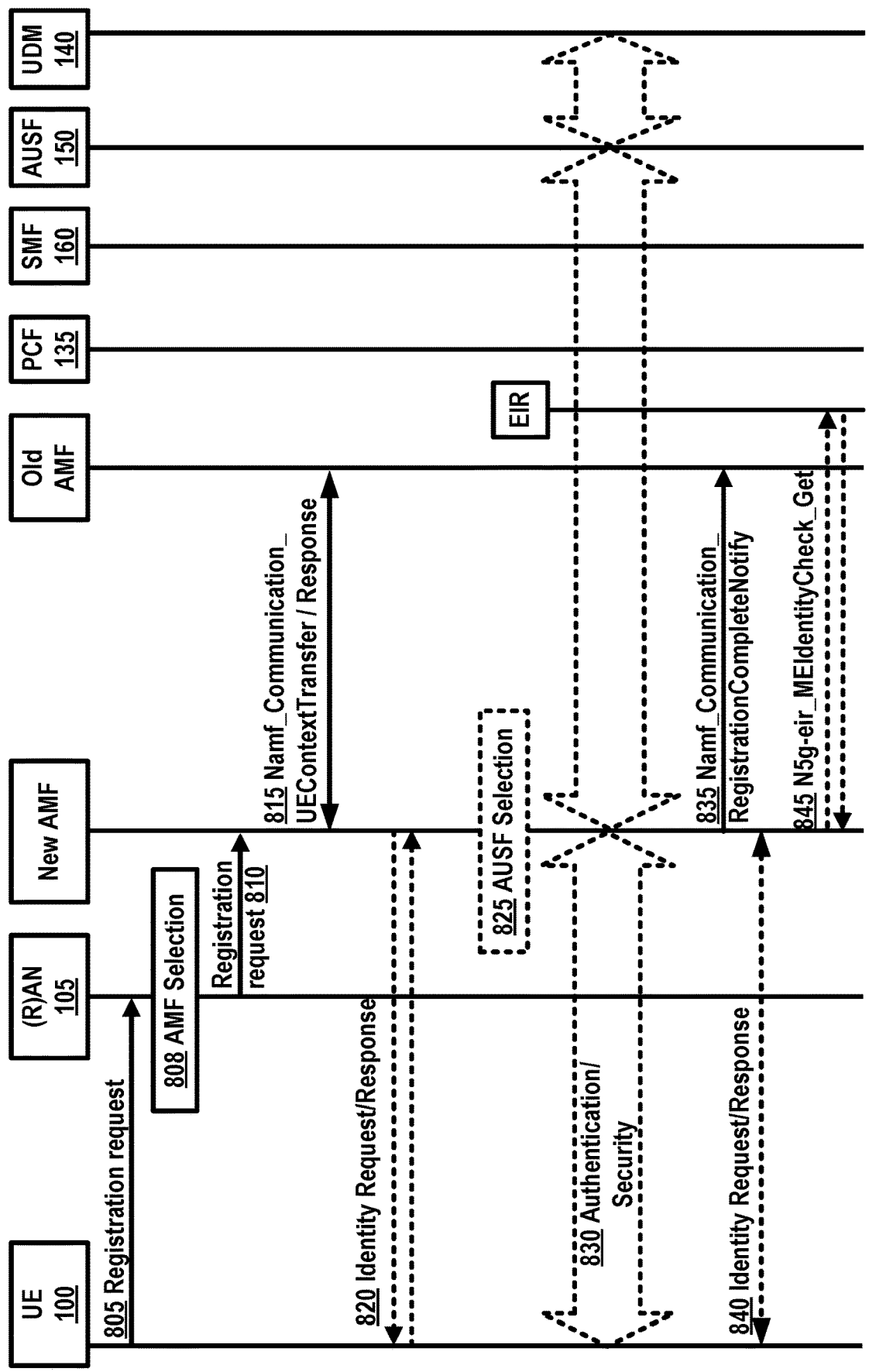
FIG. 8 is an example call flow as per an aspect of an embodiment of the present disclosure.
Figure 9:
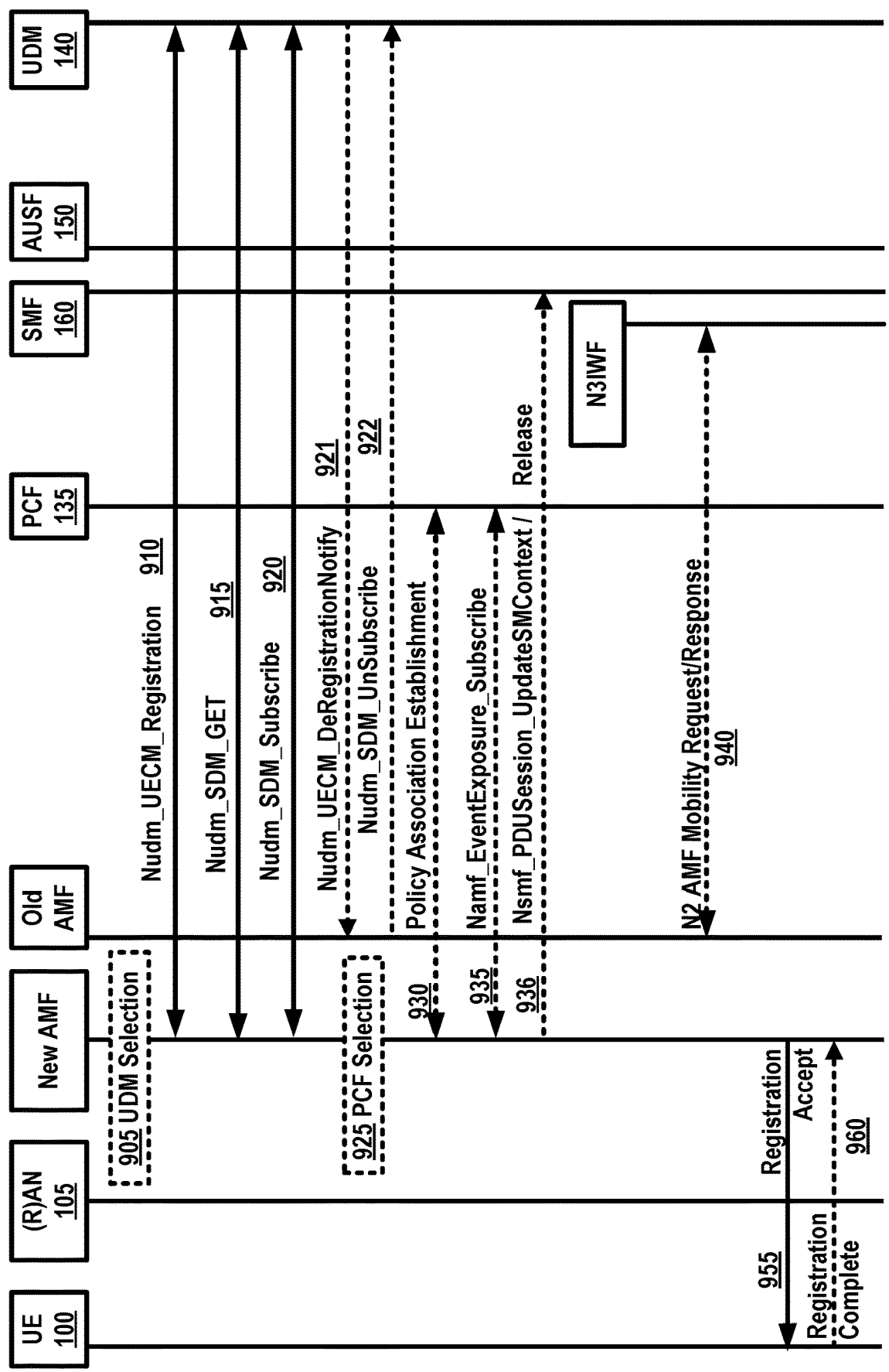
FIG. 9 is an example call flow as per an aspect of an embodiment of the present disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
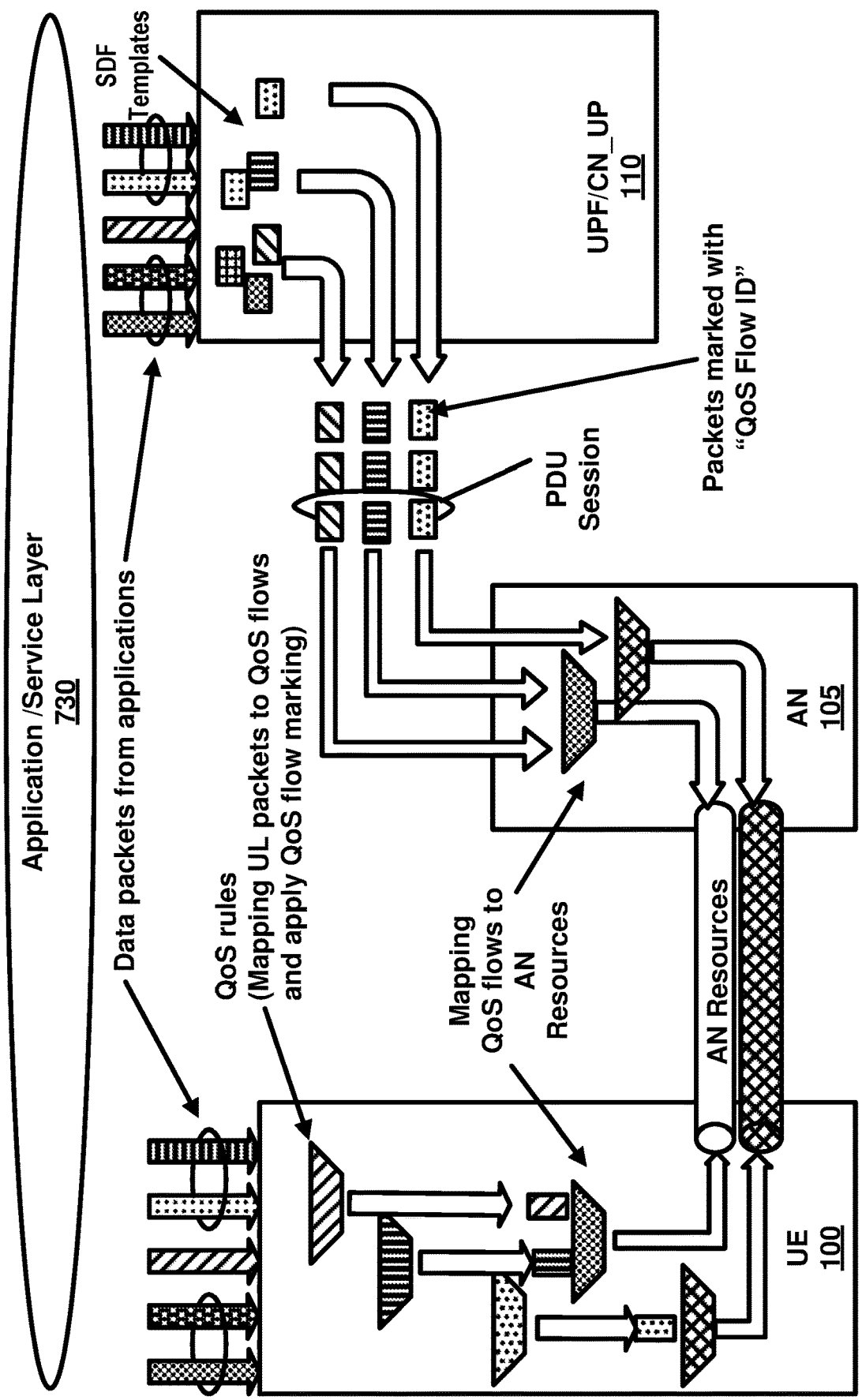
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEf 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc.) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (e.g. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (e.g., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (e.g. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 an Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(s) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentity-Check_Get service operation 845.

In an example, the new AMF 155, based on the SUPI, may select 905 a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query (access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-)PCF ID received during inter-AMF 155 mobility, the new AMF 155 may include the PCF-ID in the Npcf_AM-PolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation 935 for UE 100 event subscription.

In an example, the AMF 155 may send to the SMF 160 a Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(s) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and SGC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
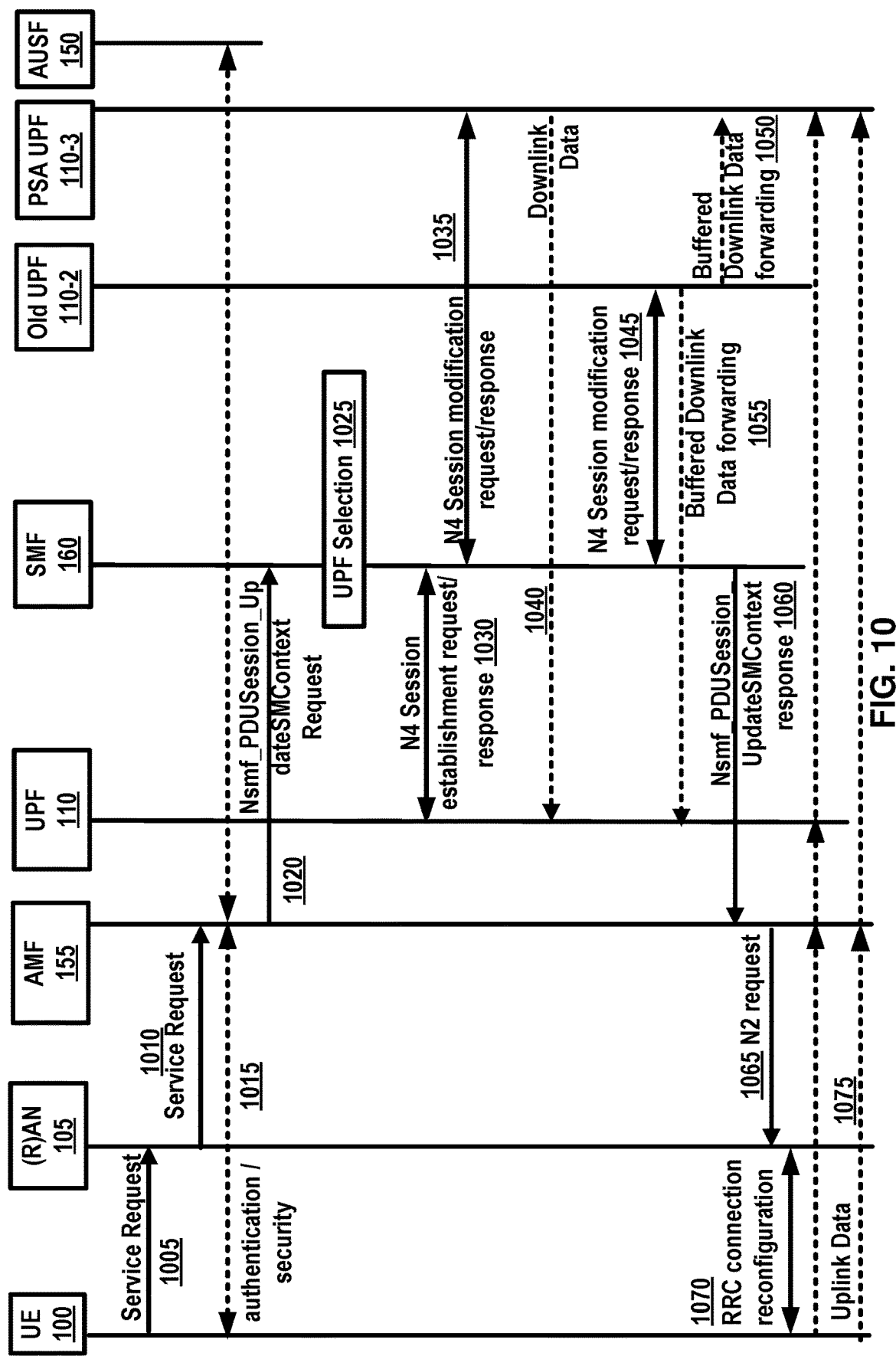
FIG. 10 is an example call flow as per an aspect of an embodiment of the present disclosure.
Figure 11:
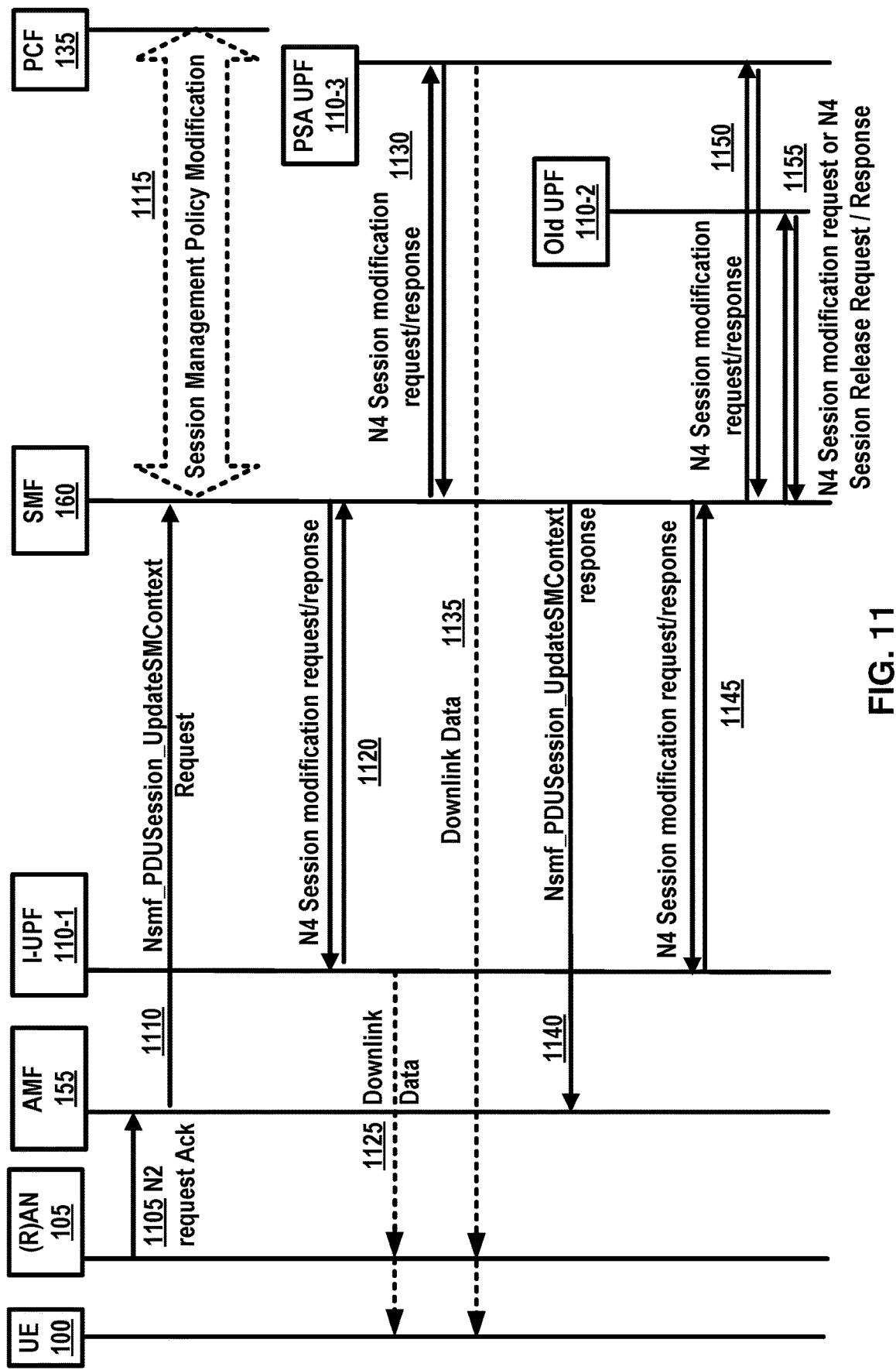
FIG. 11 is an example call flow as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an AN message comprising AN parameters, mobility management, MM NAS service request 1005 (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the AN parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s)

whose UP connections may be activated in MM NAS service request message, by the list of PDU sessions to be activated.

In an example, if the service request over 3GPP access may be triggered in response to a paging indicating non-3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message 1010 (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure 1015.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request 1020 e.g., Nsmf_PDUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send an Nsmf_PDUSession_UpdateSMContext request to SMF 160(s) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection 1025 Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (e.g. IPv4, IPv6, ethernet type or unstructured type) and if applicable, the static IP address/prefix, SSC mode selected for the PDU session, UE 100 subscription profile in UDM 140, DNAI as included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of the anchor UPF 110 which is connecting to RAN 105.

In an example, the SMF 160 may send to the UPF 110 (e.g., new intermediate UPF 110) an N4 session establishment request 1030. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request 1030 message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message 1030. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message 1035 to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response 1035. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request 1045 (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message 1060 e.g., a Nsmf_PDUSession_UpdateSM-Context response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send an Nsmf_PDUSession_UpdateSMContext response 1060 to the AMF 155 to establish the user plane(s). The N2 SM information may contain information that the AMF 155 may provide to the RAN 105. In an example, for a PDU session that the SMF 160 may determine as requiring a UPF 110 relocation for PDU session anchor UPF, the SMF 160 may reject the activation of UP of the PDU session by sending Nsmf_PDUSession_ UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_ N1N2MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSM-Context response if the PDU session may correspond to a LADN and the UE 100 may be outside the area of availability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message 1065 (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indicated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSMContext response service operations from all the SMF 160s associated with the UE 100 may be received. In such case, the N2 request message may include the N2 SM information received in each of the Nsmf_PDUSession_UpdateSMContext response and PDU session ID to enable AMF 155 to associate responses to relevant SMF 160.

In an example, if the RAN 105 (e.g., NG RAN) node may provide the list of recommended cells/TAs/NG-RAN node identifiers during the AN release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration 1070 with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in SGC.

In an example, if the N1 SM information may be transmitted to the UE 100 and may indicate that some PDU session(s) may be re-established, the UE 100 may initiate PDU session re-establishment for the PDU session(s) that may be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack 1105 (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request 1110 (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone, then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message 1115 (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure 1120 to the new I-UPF 110 and may provide AN tunnel info. The downlink data from the new I-UPF 110 may be forwarded to RAN 105 and UE 100. In an example, the UPF 110 may send to the SMF 160, an N4 session modification response 1120. In an example, the SMF 160 may send to the AMF 155, an Nsmf_PDUSession_UpdateSMContext response 1140.

In an example, if forwarding tunnel may be established to the new I-UPF 110 and if the timer SMF 160 set for forwarding tunnel may be expired, the SMF 160 may sends N4 session modification request 1145 to new (intermediate) UPF 110 acting as N3 terminating point to release the forwarding tunnel. In an example, the new (intermediate) UPF 110 may send to the SMF 160 an N4 session modification response 1145. In an example, the SMF 160 may send to the PSA UPF 110-3 an N4 session modification request 1150, or N4 session release request. In an example, if the SMF 160 may continue using the old UPF 110-2, the SMF 160 may send an N4 session modification request 1155, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response 1155. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
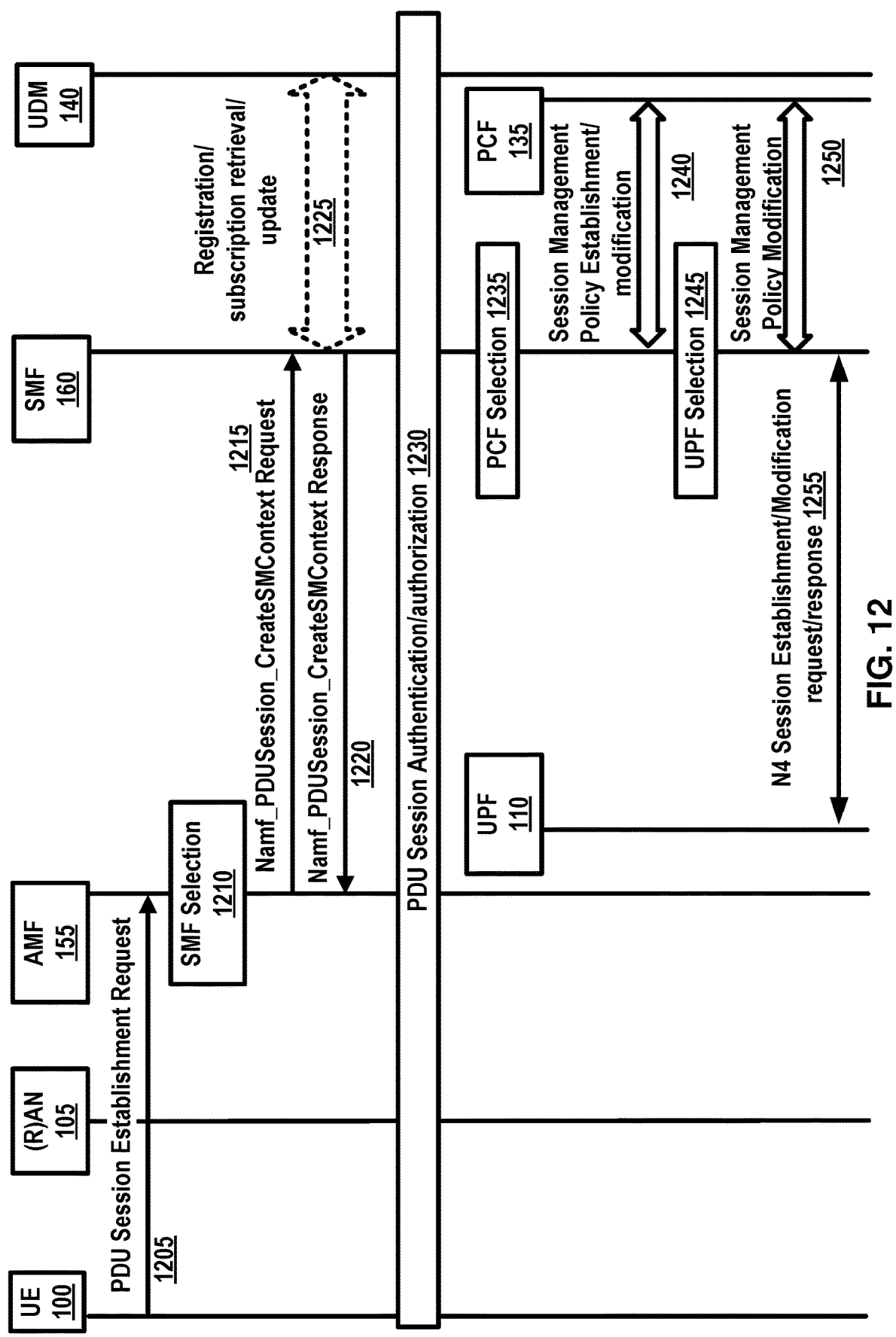
FIG. 12 is an example call flow as per an aspect of an embodiment of the present disclosure.
Figure 13:
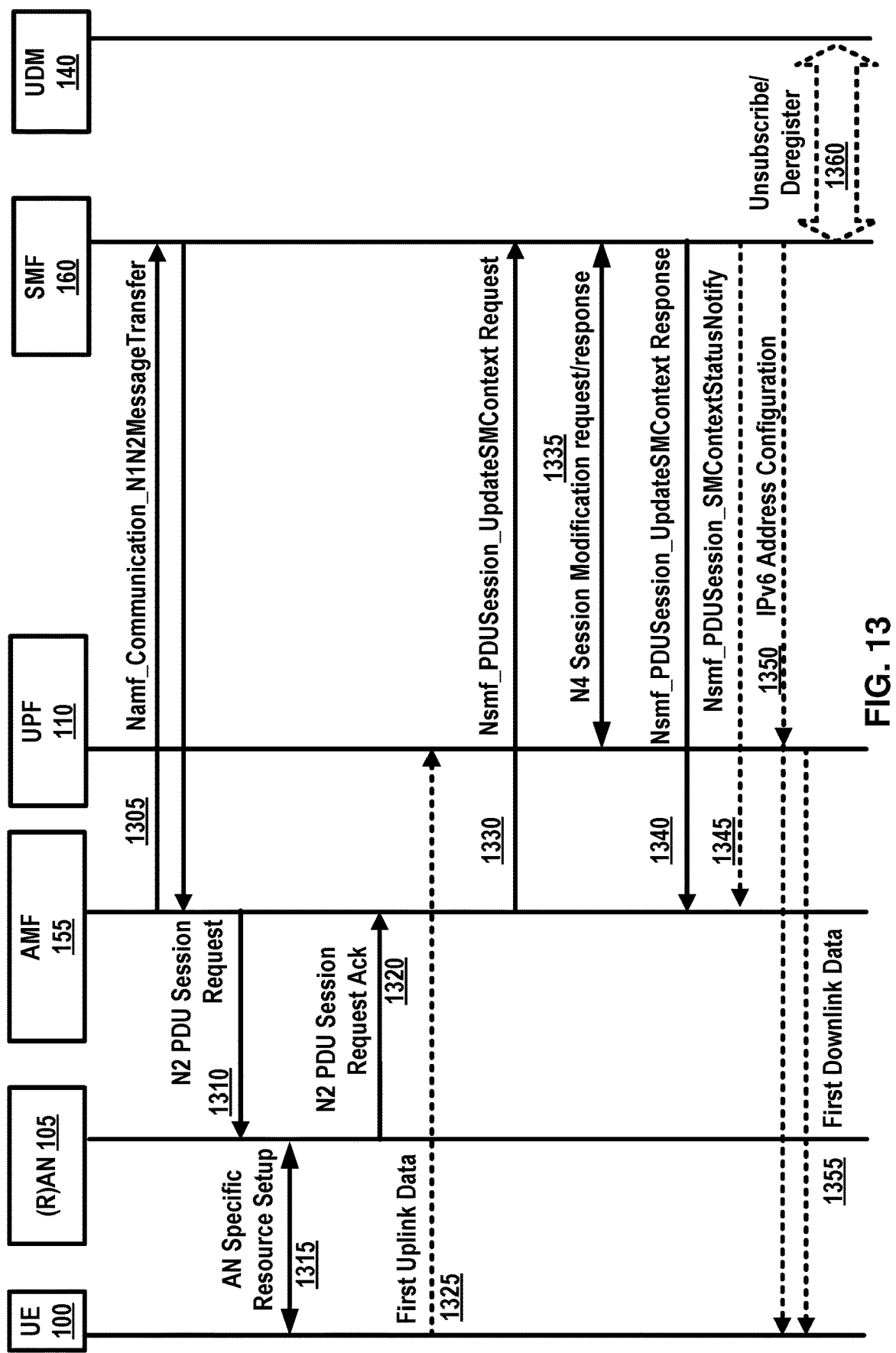
FIG. 13 is an example call flow as per an aspect of an embodiment of the present disclosure.

An example PDU session establishment procedure depicted in FIG. 12 and FIG. 13. In an example embodiment, when the PDU session establishment procedure may be employed, the UE 100 may send to the AMF 155 a NAS Message 1205 (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the AN in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the AN the NAS message (e.g., NAS SM message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription, if it may contain only one default S-NSSAI, or based on operator policy. In an example, the AMF 155 may perform SMF 160 selection 1210 and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message 1215, e.g., Nsmf_PDUSession_CreateSM-Context request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g. when request type indicates initial request), the AMF 155 may invoke the Nsmf_PDUSession_CreateSMContext request, but if the AMF 155 already has an association with an SMF 160 for the PDU session ID provided by the UE 100 (e.g. when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPT. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data 1225 and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response 1220, e.g., either a PDU session create/update response, Nsmf_PDUSession_CreateSMContext response 1220 (cause, SM context ID or N1 SM container (PDU session reject(cause))) or an Nsmf_P-DUSession_UpdateSMContext response.

In an example, the SMF 160 may perform secondary authorization/authentication 1230 during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPv6 prefix for the PDU session and N6 point-to-point tunneling (based on UDP/IPv6).

In an example, if dynamic PCC is deployed, the may SMF 160 performs PCF 135 selection 1235. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure 1240 to establish a PDU session with the PCF 135 and may get the default PCC Rules for the PDU session. The GPSI may be included if available at the SMF 160. If the request type in 1215 indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in 1215 indicates initial request, the SMF 160 may select an SSC mode for the PDU session. The SMF 160 may select 1245 one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type in 1215 is existing PDU session, the SMF 160 may maintain the same IP address/prefix that may be allocated to the UE 100 in the source network.

In an example, if the request type in 1215 indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select 1245 the UPF 110 and may select SSC mode 1.

In an example, the SMF 160 may perform a session management policy modification 1250 procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure 1255 with the selected UPF 110. The SMF 160 may initiate an N4 session modification procedure with the selected UPF 110. In an example, the SMF 160 may send an N4 session establishment/modification request 1255 to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response 1255. If CN tunnel info is allocated by the UPF, the CN tunnel info may be provided to SMF 160. In an example, if multiple UPFs are selected for the PDU session, the SMF 160 may initiate N4 session establishment/modification procedure 1255 with each UPF 110 of the PDU session.

In an example, the SMF 160 may send to the AMF 155 an Namf_Communication_N1N2MessageTransfer 1305 message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QoS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE 100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2MessageTransfer 1305 may further comprise the PDU session ID and information allowing the AMF 155 to know which access towards the UE 100 to use.

In an example, the AMF 155 may send to the (R)AN 105 an N2 PDU session request 1310 (comprising N2 SM information, NAS message (PDU session ID, N1 SM container (PDU session establishment accept, and/or the like))). In an example, the AMF 155 may send the NAS message

1310 that may comprise PDU session ID and PDU session establishment accept targeted to the UE 100 and the N2 SM information received from the SMF 160 within the N2 PDU session request 1310 to the (R)AN 105.

In an example, the (R)AN 105 may issue AN specific signaling exchange 1315 with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the PDU session request 1310. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The AN tunnel info may comprise a tunnel endpoint for each involved RAN 105 node, and the QFIs assigned to each tunnel endpoint. A QFI may be assigned to either the master RAN 105 node or the secondary RAN 105 node. In an example, (R)AN 105 may forward the NAS message 1310 (PDU session ID, N1 SM container (PDU session establishment accept)) to the UE 100. The (R)AN 105 may provide the NAS message to the UE 100 if the necessary RAN 105 resources are established and the allocation of (R)AN 105 tunnel information are successful.

In an example, the N2 PDU session response 1320 may comprise a PDU session ID, cause, N2 SM information (PDU session ID, AN tunnel info, list of accepted/rejected QFI(s)), and/or the like. In an example, the AN tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request 1330 (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure 1335 with the UPF 110. The SMF 160 may provide AN tunnel info to the UPF 110 as well as the corresponding forwarding rules. In an example, the UPF 110 may provide an N4 session modification response 1335 to the SMF 160.

In an example, the SMF 160 may send to the AMF 155 an Nsmf_PDUSession_UpdateSMContext response 1340 (Cause). In an example, the SMF 160 may subscribe to the UE 100 mobility event notification from the AMF 155 (e.g. location reporting, UE 100 moving into or out of area of interest), after this step by invoking Namf_EventExposure_Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release) 1345. In an example, if during the procedure, any time the PDU session establishment is not successful, the SMF 160 may inform the AMF 155 by invoking Nsmf_PDUSession_SMContextStatusNotify(release) 1345. The SMF 160 may releases any N4 session(s) created, any PDU session address if allocated (e.g. IP address) and may release the association with the PCF 135.

In an example, in case of PDU type IPv6, the SMF 160 may generate an IPv6 Router Advertisement 1350 and may send it to the UE 100 via N4 and the UPF 110.

In an example, if the PDU session may not be established, the SMF 160 may unsubscribe 1360 to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NSSAI). In an example, if the PDU session may not be established, the SMF 160 may deregister 1360 for the given PDU session using Nudm_UECM_Deregistration (SUPI, DNN, PDU session ID).

Figure 14:
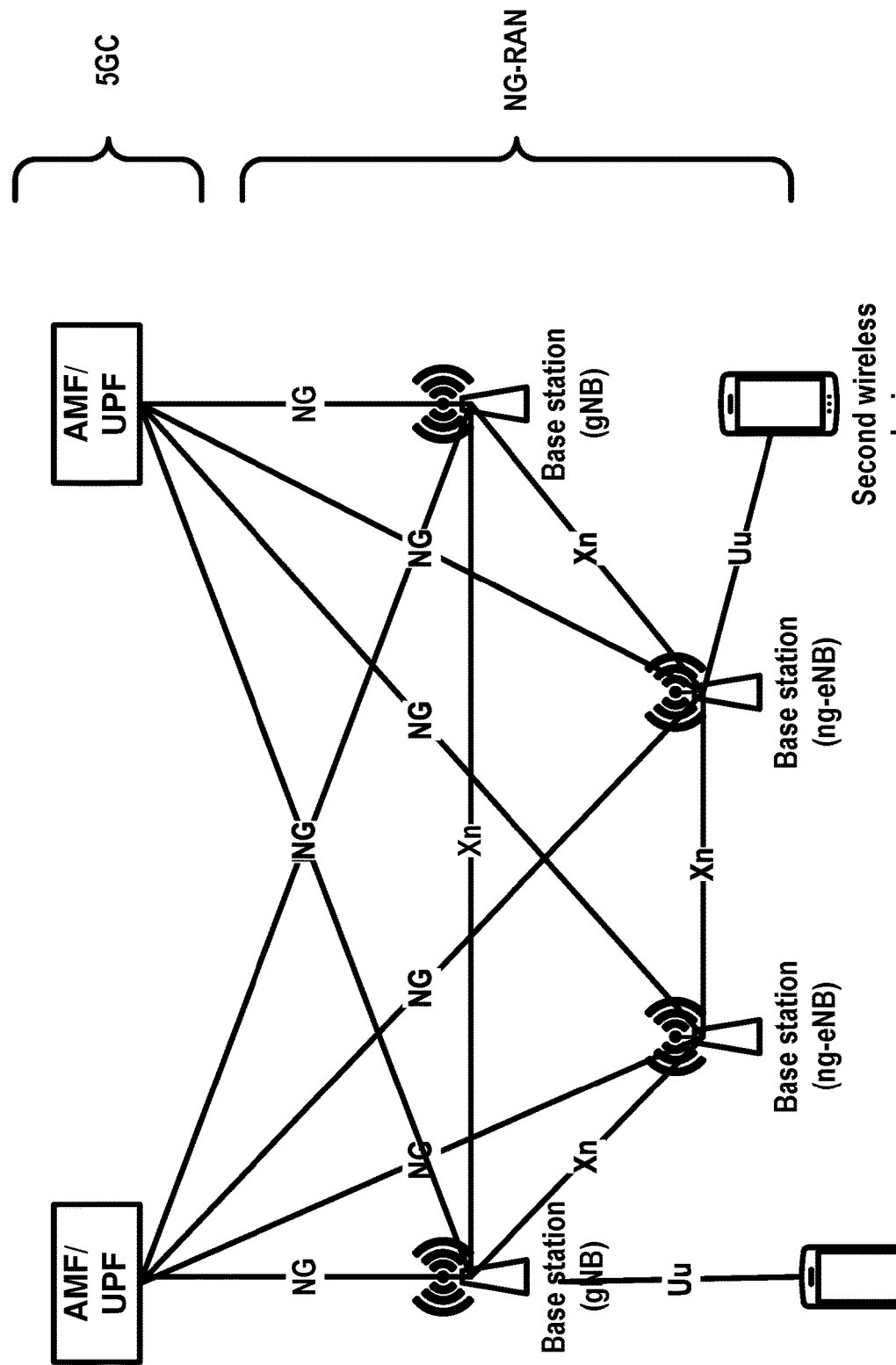
FIG. 14 is a diagram of an example wireless system architecture as per an aspect of an embodiment of the present disclosure.

FIG. 14 is an example diagram of a wireless system architecture, the wireless system comprises one or more core network function (e.g. AMF/UPF), base stations and wireless devices. As illustrated in this example, a base station may be a next generation Node B (gNB) providing New Radio (NR) user plane and control plane protocol terminations towards a first wireless device. In an example, a base station may be a next generation evolved Node B (ng-eNB), providing Evolved UMTS Terrestrial Radio Access (E-UTRA) user plane and control plane protocol terminations towards a second wireless device. The first wireless device may communicate with a gNB over a Uu interface. The second wireless device may communicate with a ng-eNB over a Uu interface.

A gNB or an ng-eNB may host functions such as radio resource management and scheduling, IP header compression, encryption and integrity protection of data, selection of Access and Mobility Management Function (AMF) at User Equipment (UE/Wireless device) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_INACTIVE state, distribution function for Non-Access Stratum (NAS) messages, RAN sharing, dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions. A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between 3rd Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

The Xn control plane interface (Xn-C) is defined between two base stations. The transport network layer is built on SCTP on top of IP. The application layer signaling protocol is referred to as XnAP (Xn Application Protocol). The SCTP layer provides the guaranteed delivery of application layer messages. In the transport IP layer point-to-point transmission is used to deliver the signaling PDUs.

Figure 15:
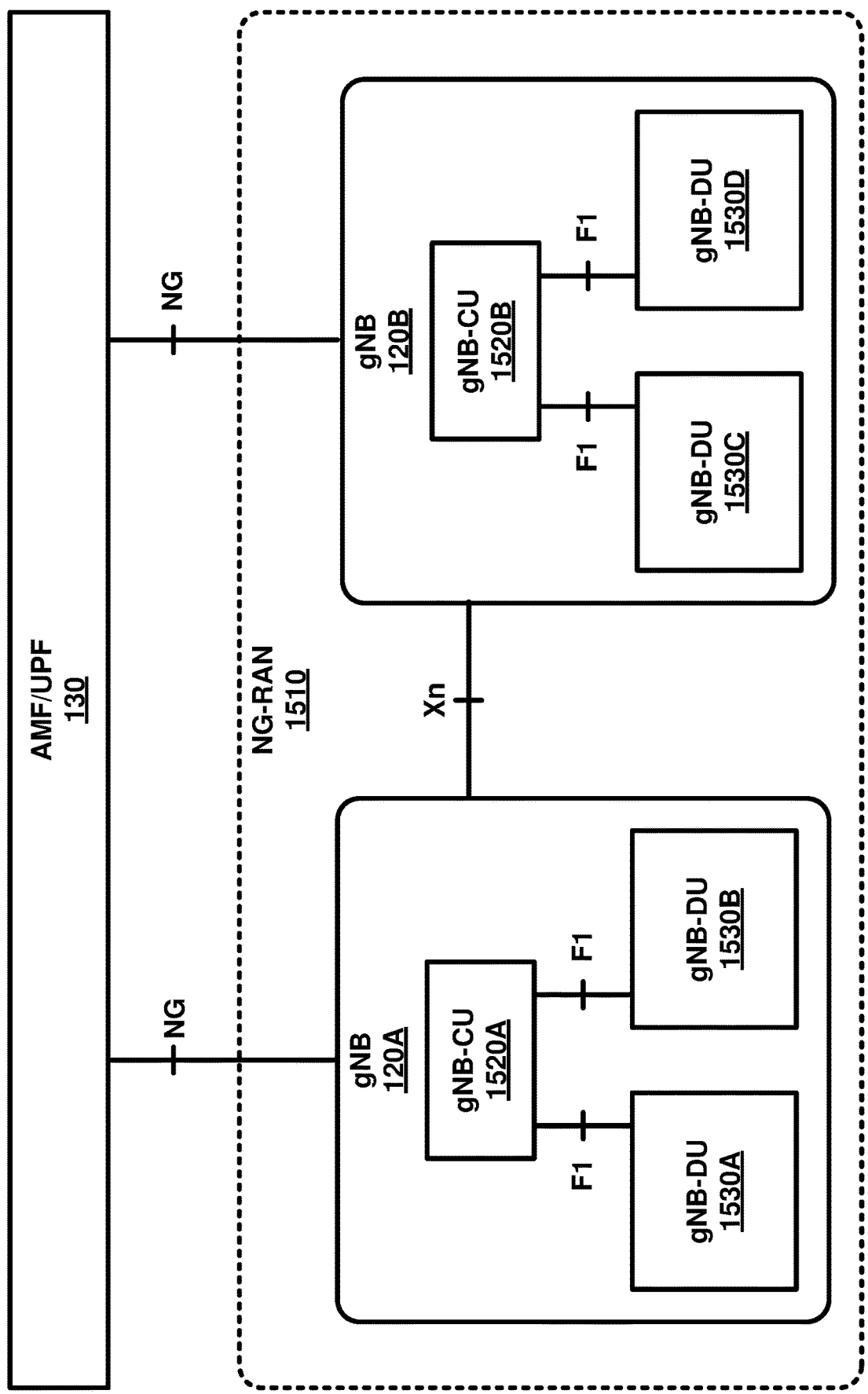
FIG. 15 is a diagram of an example radio access network (RAN) architecture as per an aspect of an embodiment of the present disclosure.

FIG. 15 is an example diagram of a RAN architecture comprising one or more base stations. In an example, a protocol stack (e.g. RRC, SDAP, PDCP, RLC, MAC, and PHY) may be supported at a node. A base station (e.g. gNB 120A or 120B) may comprise a base station central unit (CU) (e.g. gNB-CU 1520A or 1520B) and at least one base station distributed unit (DU) (e.g. gNB-DU 1530A, 1530B, 1530C, or 1530D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per wireless device, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per wireless device split, a base station (base station CU and at least one base station DUs) may provide different split options for different wireless devices. In per bearer split, different split options may be utilized for different bearers. In per slice splice, different split options may be applied for different slices.

In an example, Next generation (NG)-radio access network (RAN) is a base station which is connected to 5G core network. The NG-RAN may comprise a standalone new radio, a new radio being the anchor with E-UTRA extensions, a standalone E-UTRA, an E-UTRA being the anchor with new radio extensions.

Figure 16:
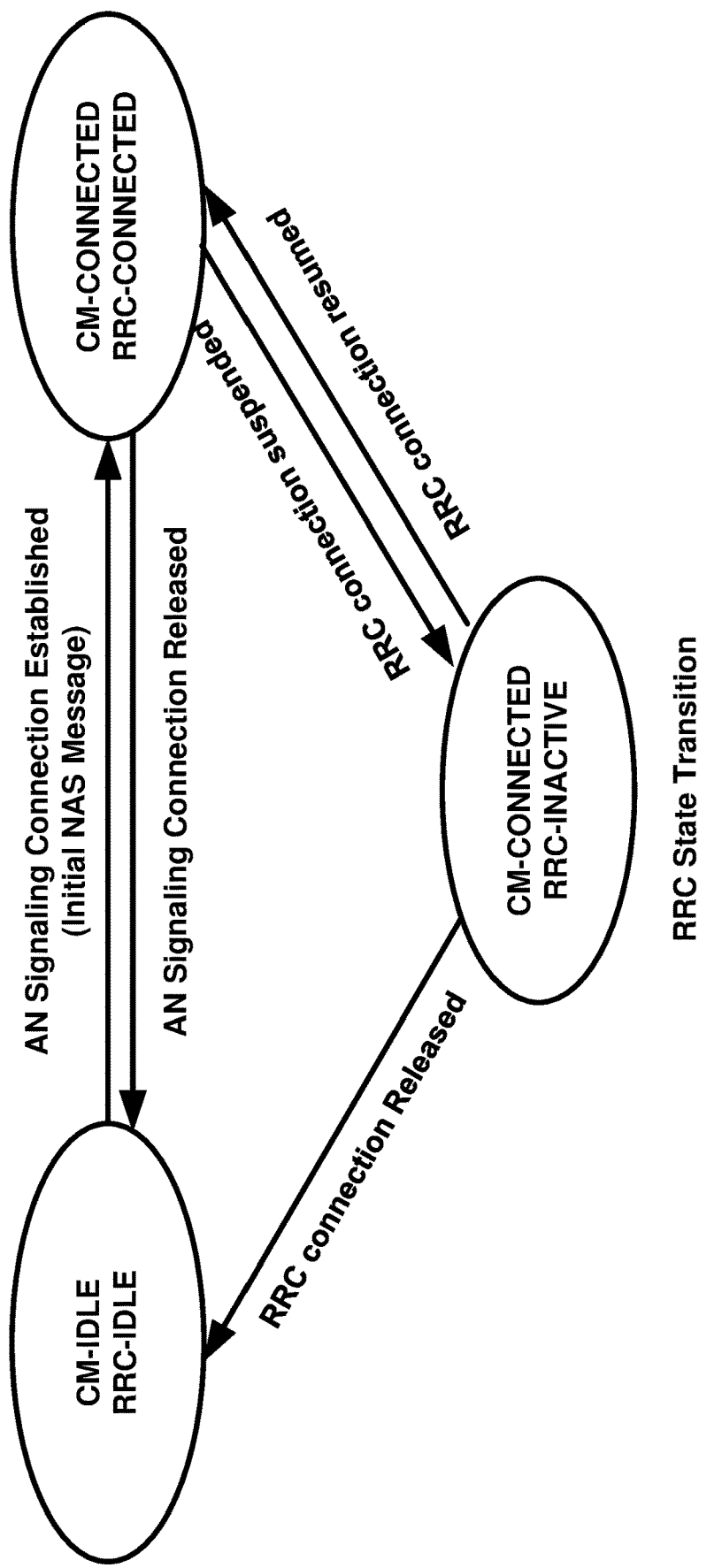
FIG. 16 is an example radio resource control (RRC) state transition aspect as per an aspect of an embodiment of the present disclosure.

As depicted in FIG. 16, a connection management (CM) state may be related to a radio resource control (RRC) state. RRC-INACTIVE (e.g. RRC inactive) may be a state where a wireless device (e.g. a UE, device) remains in CM-CONNECTED (e.g. CM connected). In an example, the wireless device may move within an area configured by a RAN (e.g. NG-RAN), referred to as a RAN notification area (RNA), without notifying the RAN. In RRC_INACTIVE state, the last serving base station (e.g., gNB) to serve the wireless device may keep the wireless device context and the UE-associated connection with the serving AMF and UPF (e.g. N2 connection, N3 connection). In an example, N2 connection is a NG-C connection. In an example, N3 connection is a NG-U connection. A wireless device in CM-IDLE may be in RRC-IDLE. In an example, a wireless device in CM-CONNECTED may be in RRC-CONNECTED.

The mobility behavior of the wireless device in RRC-INACTIVE may be similar with RRC-IDLE state behavior (e.g. cell reselection based on serving cell quality, paging monitoring, periodic system information acquisition) and may apply different parameter for RRC-IDLE and RRC-INACTIVE.

Figure 17:
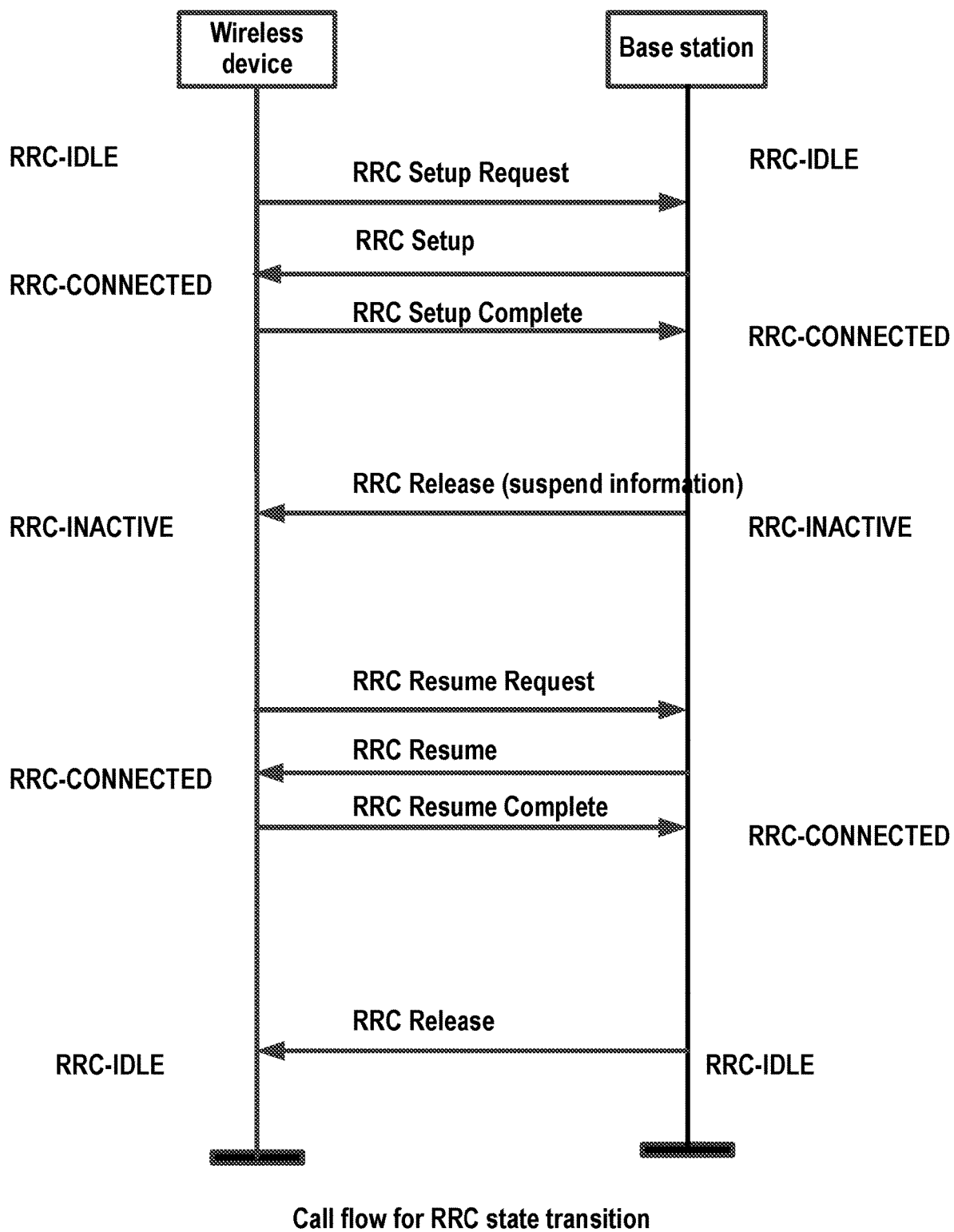
FIG. 17 is an example call flows of RRC state transition report of a wireless device.
Figure 18:
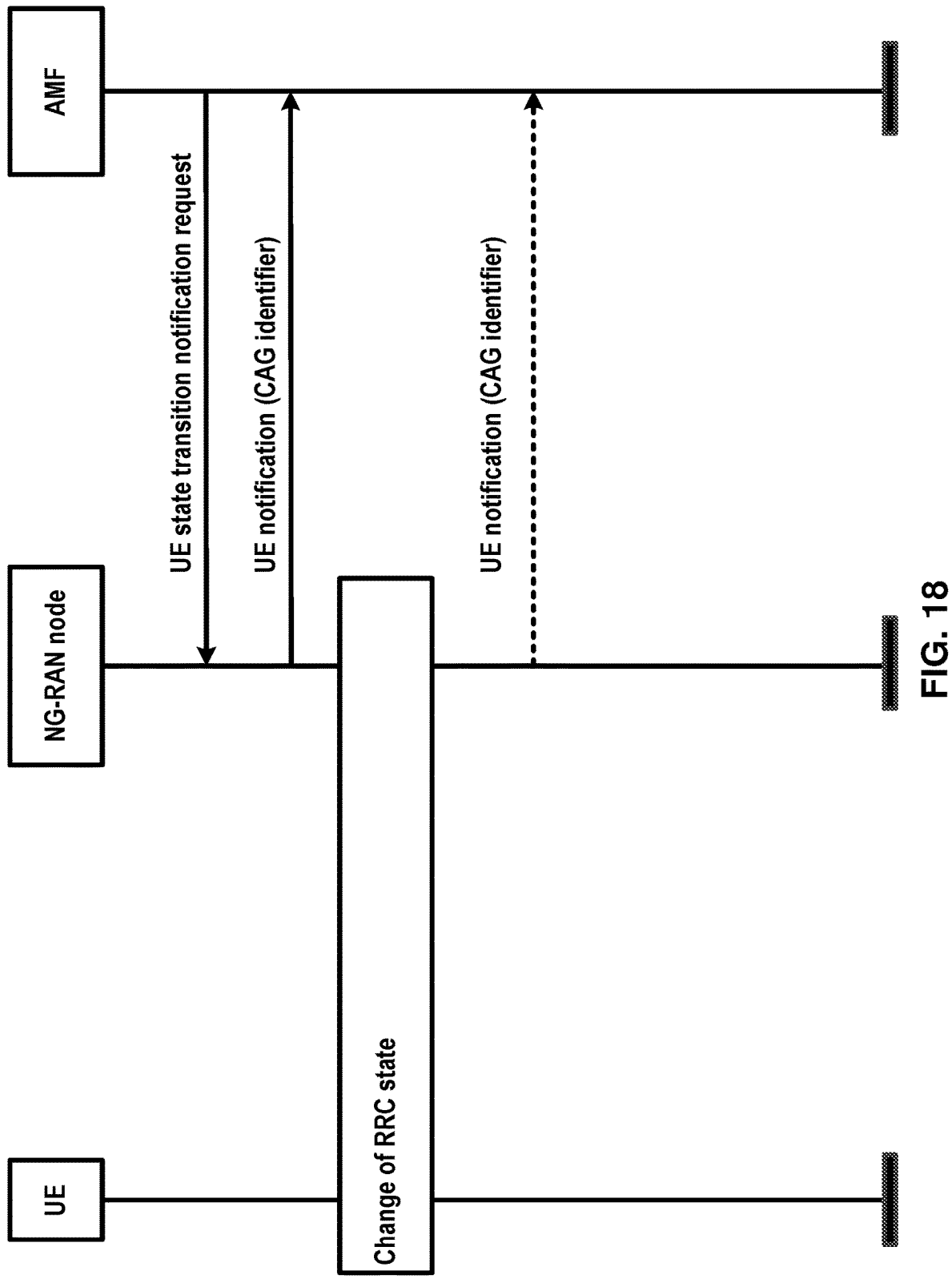
FIG. 18 is an example call flow N2 notification procedure as an aspect of an embodiment of the present disclosure.

FIG. 17 illustrates an example call flow for four RRC state transitions in accordance with embodiments of the present disclosure. The four RRC state transitions include: RRC-IDLE to RRC-CONNECTED; RRC-CONNECTED to RRC-INACTIVE; RRC-INACTIVE to RRC-CONNECTED; and RRC_CONNECTED to RRC-IDLE. It should be noted that, although the four RRC state transitions are shown as part of a single call flow diagram, each RRC state transition call flow can be performed independently from each other.

Starting with the RRC state transition from RRC-IDLE to RRC-CONNECTED, a wireless device in RRC-IDLE may send an RRC setup request message to an NG-RAN node (e.g., a gNB) to request RRC connection setup with the NG-RAN. The wireless device may receive an RRC setup message from the NG-RAN node in response to the RRC setup request message. The wireless device may transition from the RRC-IDLE to RRC-CONNECTED in response to the RRC setup message from the NG-RAN node. The RRC state maintained at the wireless device may be updated to reflect that the current RRC state of the wireless device is RRC-CONNECTED after the state transition. The wireless device may respond to the RRC setup message by sending an RRC setup complete message to the NG-RAN. The RRC state maintained at the NG-RAN node may be updated to reflect that the current RRC state of the wireless device is RRC-CONNECTED after receiving the RRC setup complete message.

For the RRC state transition from RRC-CONNECTED to RRC-INACTIVE, the NG-RAN node may send an RRC release message to the wireless device to request suspension of an RRC connection. In an example, the RRC release message may include suspend information that indicates to the wireless device that the RRC release message is for suspending instead of releasing the RRC connection. The suspend information may comprise a radio network temporary identity (RNTI) value, a radio access network (RAN) paging cycle, RAN notification area information, and/or the like. The wireless device may transition from RRC-CONNECTED to RRC-INACTIVE in response to the RRC release message from the NG-RAN node. The RRC state maintained at both the wireless device and the NG-RAN node may be updated to reflect that the current RRC state of the wireless device is RRC-INACTIVE.

For the RRC state transition from RRC-INACTIVE to RRC-CONNECTED, the wireless device may send an RRC resume request message to the NG-RAN node to request that the suspended RRC connection be resumed. The wireless device may receive an RRC resume message from the NG-RAN node in response to the RRC resume request message. In response to the RRC resume message from the NG-RAN node, the wireless device may transition from RRC-INANCTIVE to RRC-CONNECTED state and may send an RRC resume complete message to the NG-RAN node. The RRC state maintained at the wireless device may be updated to reflect that the current RRC state of the wireless device is RRC-CONNECTED after the state transition. The RRC state maintained at the NG-RAN node may be updated to reflect that the current RRC state of the wireless device is RRC-CONNECTED after receiving the RRC resume complete message from the wireless device.

Finally, for the RRC state transition from RRC-CONNECTED to RRC-IDLE, the NG-RAN node may send an RRC release message to the wireless device to request that the RRC connection be released. The wireless device may transition from RRC-CONNECTED to RRC-IDLE after receiving RRC release message from the NG-RAN node. The RRC state maintained at both the wireless device and the NG-RAN node may be updated to reflect that the current RRC state of the wireless device is RRC-IDLE.

A 5G core network node may query a NG-RAN node to get RRC state transition information of a UE. In an example, the core network may be an AMF. The AMF may send a UE state transition notification request message (e.g. UE state transition notification request message, RRC state notification message) to a NG-RAN node, requesting to report the RRC state transition information as illustrated in FIG. 16. The UE state transition notification request message may comprise AMF UE NGAP ID, RAN UE NGAP ID, an RRC Inactive Transition Report Request information element (IE) and/or the like. The AMF UE NGAP ID may uniquely identify a UE association over the NG interface (e.g. N2 interface) within the AMF side. The RAN UE NGAP ID may uniquely identify a UE association over the NG interface within the NG-RAN side. The RRC Inactive Transition Report Request IE may indicate a condition of RRC state transition reporting and may comprise a subsequent state transition report, single RRC connected state report, cancel report and/or the like.

In an example, the NG-RAN may report to the AMF by sending a UE notification message (e.g. RRC INACTIVE TRANSITION REPORT, RRC state information message) comprising an RRC state of the UE if the UE transition into RRC-CONNECTED from RRC-INACTIVE or vice versa in case the RRC Inactive Transition Report Request information element (IE) is set to "subsequent state transition report". In an example, the NG-RAN may report to the AMF by sending the UE notification message but no subsequent UE notification messages if the UE is in RRC_CONNECTED state and the RRC Inactive Transition Report Request IE is set to "single RRC connected state report". In an example, the NG-RAN may report to the AMF one UE notification message plus one subsequent UE notification message when the RRC state transitions to RRC_CONNECTED state if the UE is in RRC_INACTIVE state and the RRC Inactive Transition Report Request IE is set to "single RRC connected state report". In an example, the NG-RAN may stop reporting to the AMF the RRC state of the UE in case the RRC Inactive Transition Report Request IE is set to "cancel report". In an example, the UE notification message may further comprise AMF UE NGAP ID, RAN UE NGAP ID, user location information and/or the like. The user location information may comprise a tracking area identity, a cell global identity, an age of location (e.g. time stamp information as defined in IETF RFC 5905) of the location information, CAG information, and/or the like. The reporting of RRC state transitions may be requested per UE by the AMF. The continuous reporting by setting "subsequent state transition report" of all RRC state transitions can be enabled by operator local configuration. In an example, the CAG information may comprise supported CAG list of the cell, supported CAG list of the cell which belonging to an allowed CAG list of the wireless device, and/or the like.

Local Area Data Network (LADN) may be data network that is accessible by a wireless device only in specific locations. The access control of LADN may be per PDU session rather than per wireless device. An access to a data network via a PDU Session for a LADN is only available in a specific LADN service area. A LADN service area is a set of tracking areas. The LADN is a service provided by the serving PLMN.

5G System may support a functionality of tracking and reporting wireless device mobility events. An AMF may provide a wireless device mobility related event reporting to network function (NF) that has been authorized to subscribe to a wireless device mobility event reporting service. In an example, the wireless device mobility event reporting service may be a UE mobility event reporting service. NF service consumer such as SMF, PCF or NEF that wants to be reported on the UE location (a location of a wireless device) may be able to subscribe to the UE mobility event notification service to the AMF with related parameters.

In an example, the related parameters may comprise an event reporting type, an area of interest, an event reporting information, a notification address, a target of event reporting, and/or the like.

In an example, the event reporting type may indicate what to be reported on UE mobility. In an example, the event reporting type may comprise a UE location, a UE mobility on area of interest, and/or the like. In an example.

In an example, the area of interest may indicate a geographical area. The area of interest may comprise a list of tracking areas, a list of cells, a list of base station node identifiers, a LADN, a predefined area as the area of interest, and/or the like.

If a SMF request to know the UE mobility event based on LADN, the SMF may provide a LADN DNN/LADN as the area of interest. The AMF may identify a list of tracking areas corresponding to the LADN DNN based on local configuration. In an example, a service operator or public land mobile network (PLMN) operator may provide LADN service a coffee house in an area close to the coffee house. In this case, the service operator/PLMN operator may configure associated/corresponding tracking areas (e.g. TA identity list) to the coffee house LADN in AMFs connected to the areas.

In an example, the predefined area may be a region of city or county. A PLMN operator may configure associated/corresponding tracking areas to the predefined area in AMFs connected to the region.

In an example, the event reporting information may be control information of the event reporting. The event reporting information may comprise an event reporting mode, number of reports, maximum duration of reporting, event reporting condition (e.g. when a wireless device moves into a specified area of interest). In an example, the event reporting mode may indicate reporting up to a maximum number of reports, periodic along with periodicity, reporting up to a maximum duration and/or the like.

In an example, the notification address may be an endpoint address of NF service consumer to be notified.

In an example, the target of event reporting may indicate a specific wireless device, a group of wireless devices or any wireless device (i.e. all UEs).

If an NF service consumer subscribes to the UE mobility event notification service provided by AMF for reporting of UE presence in area of interest, the AMF may track UE's location considering UE's CM state and using base station (e.g. NG-RAN) procedures (if RRC-INACTIVE state applies to base station) in order to determine the UE presence in the area of interest. In an example, the AMF may notify the UE presence in the area of interest and the new UE location (e.g. tracking area identity, cell identity) to the subscribed NF consumer, in response to detecting a change of the UE presence in the area of interest. In an example, the UE presence in the area of interest may be a wireless device presence in the area of interest. The UE presence in the area of interest may comprise in, out, unknown and/or the like.

In an example, serving AMF may be changed in response to mobility of a wireless device. In this case, a subscription of mobility event may be transferred from the old AMF to a new AMF. The new AMF may decide not to notify the SMF with the current status related to the subscription of mobility event if the new AMF determines that, based on mobility management context of the UE, the event is reported by the old AMF.

In an example, a wireless device may leave or enter an area of interest without any notification to the 5GC in CM-CONNECTED state (i.e. in the case that RRC-INACTIVE state applies to a base station (e.g. NG-RAN)). The AMF may initiate the NG-RAN location reporting or N2 Notification procedure to track the UE presence in the area of Interest.

A base station may support a NG-RAN location reporting for services that require accurate cell identification (e.g. emergency services, lawful intercept, charging) or for the UE mobility event notification service subscribed to the AMF by other network functions (NF). In an example, the other NF may comprise a SMF, a NEF, a PCF, and/or the like. The NG-RAN location reporting may be used by the AMF when a wireless device is in CM-CONNECTED state. The AMF may request the NG-RAN location reporting with event reporting type (e.g. UE location or UE presence in Area of Interest), reporting mode and its related parameters (e.g. number of reporting).

In an example, if the AMF requests UE location, the base station may report a current location of the wireless device (or last known UE location with time stamp if the wireless device (e.g. UE) is in RRC-INACTIVE state) based on the requested reporting parameter (e.g. one-time reporting or continuous reporting).

In an example, if the AMF requests UE presence in the area of interest (AOI), the base station may report a location of the wireless device and an indication (i.e. IN, OUT or UNKNOWN) when the base station determines a change of UE presence in area of interest.

The AMF may re-request the NG-RAN location reporting to the target base station node after successful handover if required. In other word, source base station node doesn't have to transfer the requested NG-RAN location reporting information to target NG-RAN node.

Non-public networks (NPN) may be intended for the use of a private entity such as an enterprise, and may be deployed in a variety of configurations, utilizing both virtual and physical elements. The NPN may be deployed as standalone networks (i.e. stand-alone non-public network (SNPN)). As an implementation alternative, the NPN may be hosted by a PLMN and may be offered as a slice of a PLMN (i.e. a public network integrated NPN).

Public network integrated (PNI)-NPNs are NPNs made available via PLMNs e.g. by means of dedicated DNNs, or by one (or more) network slice instances allocated for the NPN. When an NPN is made available via a PLMN, then the wireless device may have a subscription for the PLMN. As network slicing does not enable the possibility to prevent wireless devices from trying to access the network in areas which the wireless device is not allowed to use the network slice allocated for the NPN, closed access groups (CAG)s may be used in addition to network slicing to apply access control.

A CAG may identify a group of subscribers who are permitted to access one or more cells associated to the CAG. In an example, CAG is used for the PNI-NPNs to prevent wireless device(s), which are not allowed to access the NPN via the associated cell(s), from automatically selecting and accessing the associated cell(s).

In an example a CAG is identified by a CAG identifier (or CAG identity) which is unique within the scope of a PLMN ID. A CAG cell may broadcast one or multiple CAG Identifiers per PLMN. It is assumed that a base station (e.g. NG-RAN) supports broadcasting a total of twelve CAG Identifiers. A CAG cell may in addition broadcast a human-readable network name per CAG Identifier. In an example, the human-readable network name may be an enterprise name and used for presentation to user when user requests a manual CAG selection.

To support CAG, the wireless device may be configured, using the wireless device configuration update procedure for access and mobility management related parameters with CAG information, included in the subscription as part of the mobility restriction. The CAG information may comprise an allowed CAG list (i.e. a list of CAG Identifiers the wireless device is allowed to access), an indication whether the wireless device is only allowed to access 5GS via CAG cells, and/or the like. In an example, the indication is a CAG restriction indicator. The wireless device which is only allowed to access 5GS via CAG cells, may not access to non-CAG cell which does not broadcast any CAG identifiers. If the CAG restriction indicator of the wireless device is positive value, the wireless device is only allowed to access 5GS via CAG cells. If the CAG restriction indicator of the wireless device is negative value, the wireless device is allowed access 5GS via non-CAG cell. In an example, the meaning of negative and positive of the CAG restriction indicator may be altered.

To support CAG, a base station may broadcast CAG related information via cells. In an example, a cell broadcasting one or more CAG identifiers may be a CAG cell. In an example, a cell does not broadcast any CAG identifier may be a non-CAG cell. In an example, the CAG related information may comprise an indication that only wireless device supporting CAG is allowed to access. The CAG cell and the non-CAG cell may broadcast the indication. The indication of the CAG cell may be positive value and the indication of the non-CAG cell may be negative value. In an example, a wireless device may determine whether to access the cells based on the broadcasted CAG related information and the CAG information of the wireless device. The mobility (e.g. cell-reselection for camping, handover) of a wireless device may be controlled/restricted by the CAG information of the wireless device and the CAG related information of the base station/cell. FIG. 19A and FIG. 19B shows example diagram registration CAG deployments.

In an example, the functionality of tracking and reporting wireless device mobility events may be used to support services which require area-basis session handling/charging control/policy enforcement. In an example, a UE location and a UE presence in an area of interest event may be used for the tracking and reporting wireless device mobility events. In an example, the UE location or the area of interest may be a predefined area (e.g. LADN area) and represented as an area identifier in the network functions. The AMF may identify a list of tracking areas or cell areas corresponding to the area identifier based on a local configuration. The AMF may request a location reporting to a base station the list of tracking area or cell areas corresponding to the area identifier.

A closed access group (CAG) is used for access control of a wireless device when the wireless device and a 5G network supports a PNI-NPN. To support a CAG area-based session handling/charging control/policy enforcement, the wireless device mobility event may be extended to support the CAG area-based event report. The existing mobility events requires the AMF identifying a list of tracking areas or cell areas corresponding to the area identifier based on a local configuration. The existing mobility events may be inefficient to support CAG area-based event report due to a maintenance effort of CAG area and cell identities mapping information in an AMF (e.g. CAG is a cell granularity and may be locally installed based on 3'rd party agreement). Accordingly, in order to decrease an O&M effort and increase a protocol efficient, an enhanced location reporting/mobility event notification is needed.

Embodiments of the present disclosure may reduce the O&M maintenance effort. Embodiments of the present disclosure may decrease a size of location reporting control/report message in N2/NG-C interface. In an example, a network function may send an event exposure subscribe message to an AMF, requesting to notify a change of CAG area. The AMF may send a location reporting control message comprising CAG identifier to a base station in response to receiving the event exposure subscribe message. The base station may track and report a change of wireless device location based on the CAG identifier.

Figure 20:
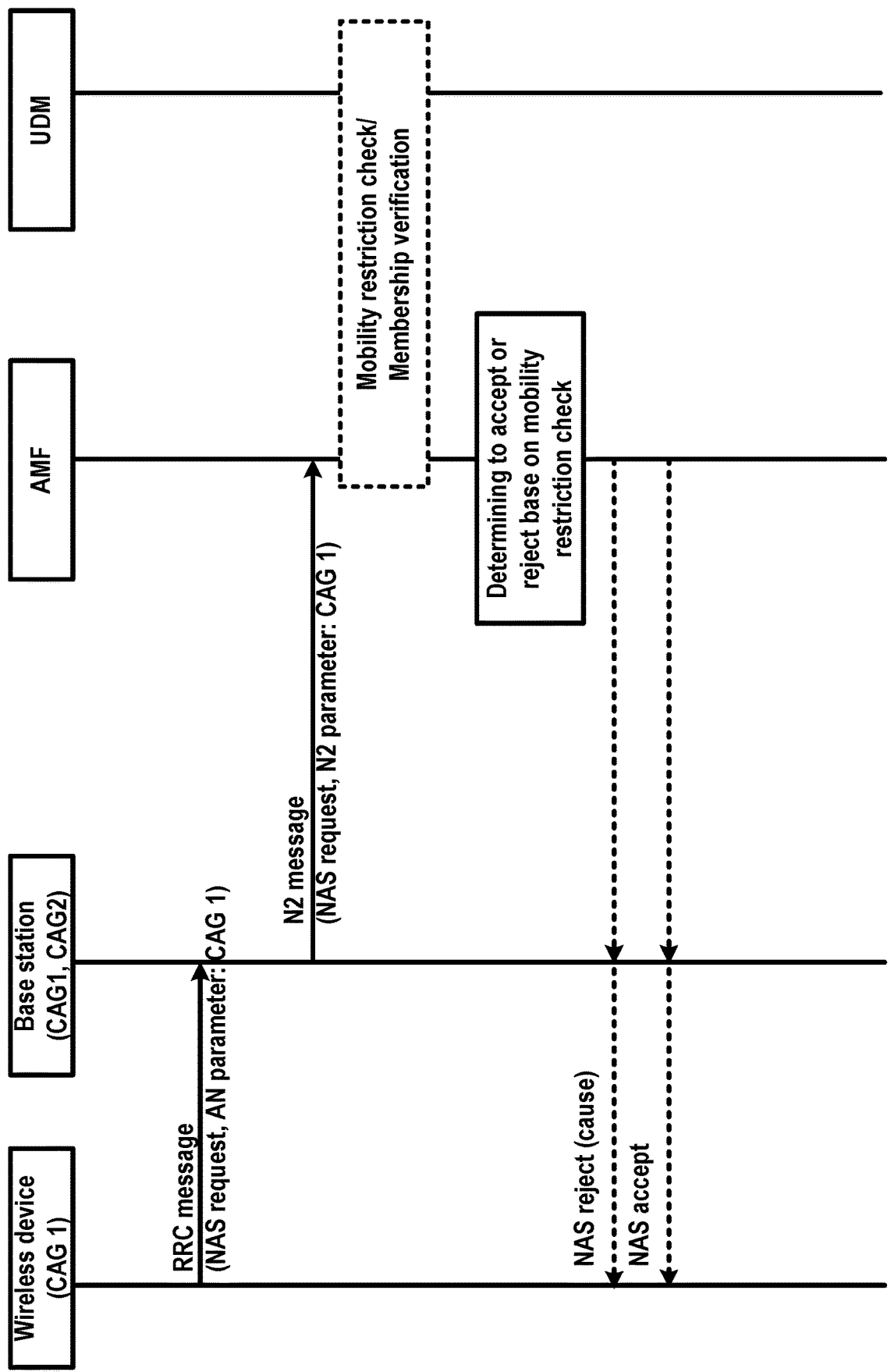
FIG. 20 is an example diagram of an access control of CAG cell.
Figure 21:
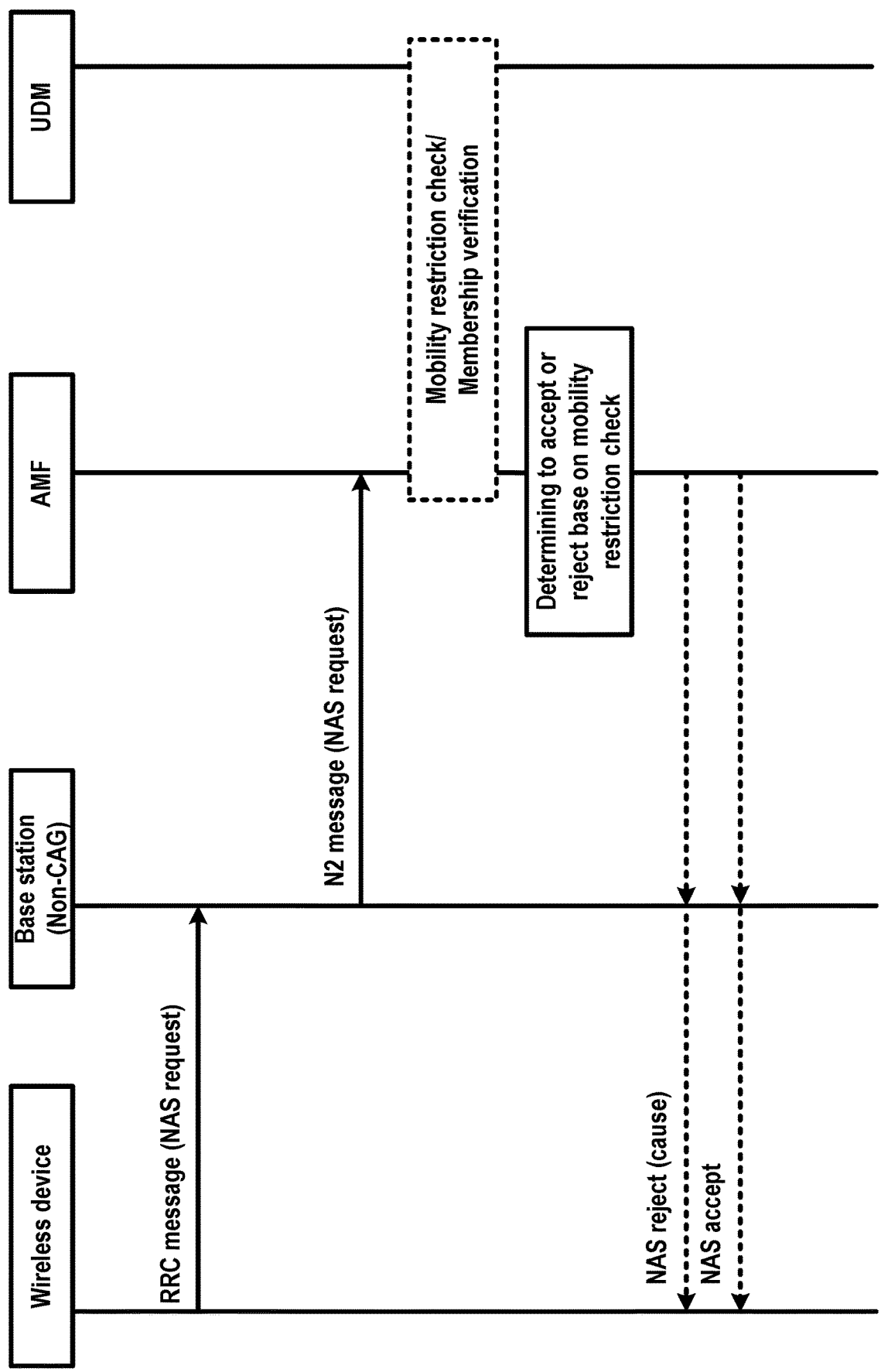
FIG. 21 is an example diagram of an access control of Non-CAG cell.

FIG. 20 and FIG. 21 shows example embodiments of present disclosure about an access control/mobility restriction/membership verification regarding CAG of a wireless device during transition from CM-IDLE to CM-CONNECTED. FIG. 20 shows how a 5G system (5GS) controls a wireless device accessing to a CAG cell. FIG. 21 shows how a 5G system/network controls a wireless device accessing to a non-CAG cell.

As illustrated in FIG. 20, a wireless device is configured as CAG identifier 1 (CAG 1) and is accessing to a base station via a cell which broadcasts CAG 1, CAG 2. The wireless device may send a radio resource control (RRC) message after a completion of RRC connection setup with the base station, requesting a connection transition from CM-IDLE to CM-CONNECTED. In an example, the RRC message is RRC connection setup complete message. In an example, the RRC message may comprise a NAS request message and access network (AN) parameters. In an example, the NAS request message may be a registration request message or a service request message. The AN parameter may include CAG identifier (CAG 1). The base station may check whether the CAG identifier in the AN parameter is supported by the cell in response to receiving the RRC message from the wireless device. In an example, a CAG identifier provided by a wireless device may be used by a base station to select an appropriate AMF. The base station may select an appropriate AMF based on the CAG identifier (CAG 1). In an example, two or more AMFs may be connected to the base station, and some AMFs may not support CAG 1 or slices corresponding to the CAG 1. The base station may send an N2 message comprising the NAS message and the CAG identifier (CAG 1) from the RRC message, to the AMF.

In an example, the AMF may have context information of the wireless device comprising an allowed CAG list (CAG white list) and the allowed CAG list may include CAG 1. In this case, the AMF may determine that the wireless device is allowed to access the 5GS via the base station with CAG 1 and may send an NAS accept message to the wireless device in response to the determining.

In an example, the AMF may have context information of the wireless device but does not have an allowed CAG list or CAG 1 in the allowed CAG list of the wireless device. In this case, the AMF may check with a UDM whether the wireless device is allowed to access to a cell comprising CAG 1. If the wireless device is allowed to access the cell with CAG 1, the AMF may include CAG 1 into the allowed CAG list of the wireless device and send a NAS accept message to the wireless device. If the wireless device is not allowed to access to the cell with CAG 1, the AMF may reject the wireless device by sending a NAS reject message with appropriate cause value.

In an example, if the AMF does not have context information of the wireless device (this may be an initial registration case), the AMF may interact with a UDM and perform a registration procedure. During the registration procedure, the AMF may check whether the wireless device is allowed to access a cell with CAG 1. If the wireless device is allowed to access the cell with CAG 1, the AMF may generate an allowed CAG list and include CAG 1 into the allowed CAG list of the wireless device. In an example, the AMF may send a NAS accept message (i.e. registration accept) to the wireless device in response to the allowing. If the wireless device is not allowed to access the cell with CAG 1, the AMF may reject the wireless device by sending a NAS reject message (i.e. registration reject) with an appropriate cause value.

In FIG. 21, a wireless device is accessing to a base station via a non-CAG cell. The wireless device may send a radio resource control (RRC) message after a completion of RRC connection setup with the base station, requesting a connection transition from CM-IDLE to CM-CONNECTED. In an example, the RRC message is RRC connection setup complete message. The RRC message may comprise a NAS request message and access network (AN) parameter. The wireless device does not include any CAG identifier while accessing a non-CAG cell. In an example, the NAS request message is a registration request message or a service request message. The base station may send an N2 message comprising the NAS message in the RRC message to the AMF. In an example, the N2 message does not include any CAG identifier.

In an example, the AMF may have context information of the wireless device comprising a CAG restriction indicator. The AMF may determine whether the wireless device is allowed to access the 5GS via non-CAG cell based on the CAG restriction indicator of the wireless device. In an example, the AMF may determine that the wireless device is allowed to access the 5GS via non-CAG cell in response to the CAG restriction indicator being a negative value (i.e. the CAG restriction indicator saying that the wireless device is not restricted to access a 5GS via only CAG cell). The AMF may send a NAS accept message to the wireless device in response to the determination. In an example, the AMF may determine that the wireless device is not allowed to access the 5GS via a non-CAG cell in response to the CAG restriction indicator being a positive value (i.e. the CAG restriction indicator saying that the wireless device is restricted to access a 5GS via only CAG cell). The AMF may send a NAS reject message with appropriate cause value to the wireless device in response to the determining. In an example, the cause value may indicate that the request is rejected since the wireless device is access via non-CAG cell. In an example, the cause value may indicate that the request is rejected since the wireless device is not allowed to access non-CAG cell.

In an example, if the AMF does not have context information of the wireless device (this is maybe initial registration case), the AMF may perform a registration procedure. During the registration procedure, the AMF may interact with a UDM and check whether the wireless device is allowed to access via a non-CAG cell based on a CAG restriction indicator of the wireless device. The AMF behavior is same with previous description based on the CAG restriction indicator of the wireless device.

Figure 22:
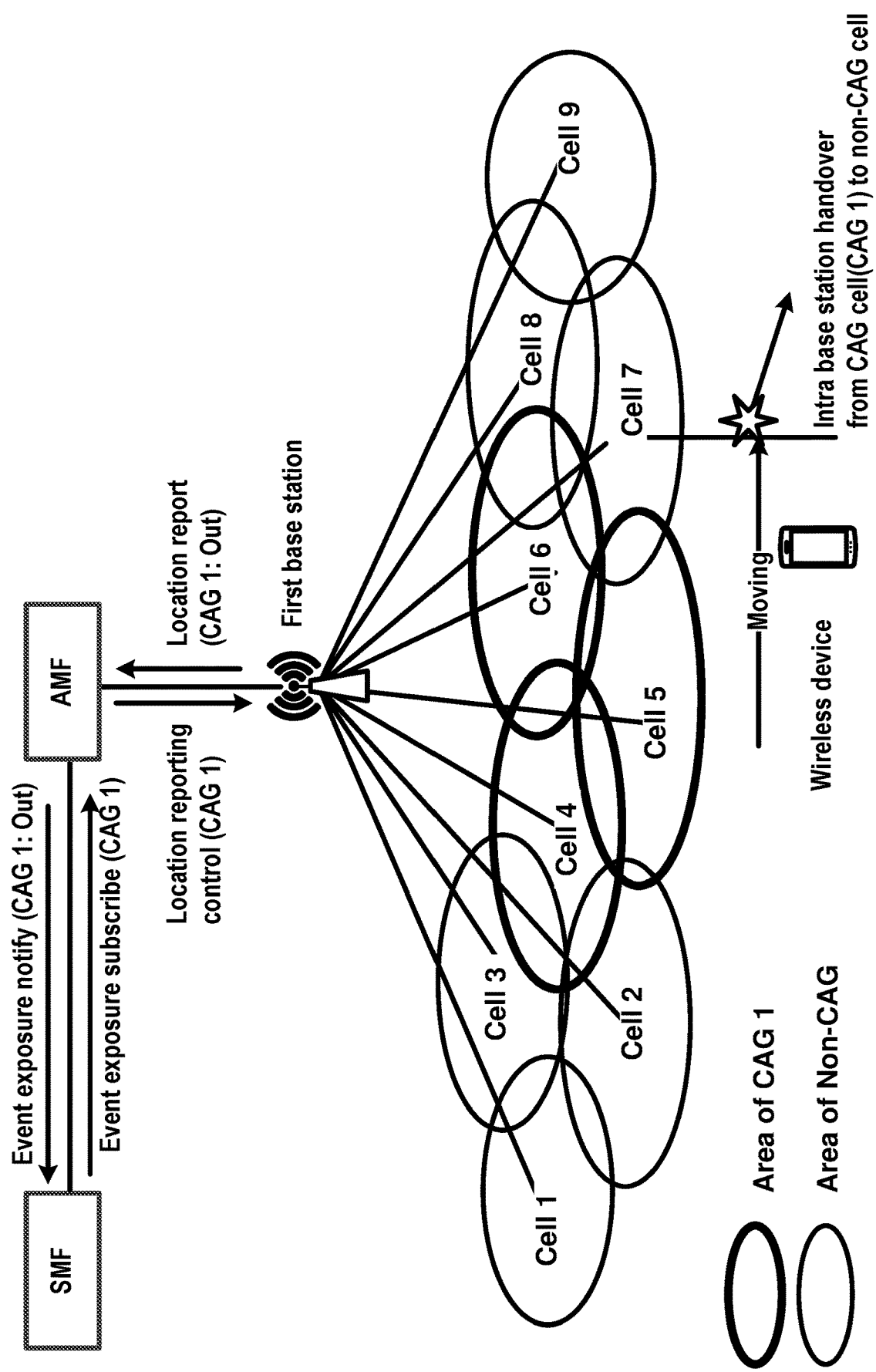
FIG. 22 is an example diagram of an aspect of an embodiment of the present disclosure.

FIG. 22 illustrates example embodiment of a mobility event notification between a first base station, an AMF, a SMF and a wireless device in accordance with embodiments of the present disclosure. The first base station may be a serving base station and comprises nine cells. Three cells (e.g. cell 4, cell 5, cell 6) among nine are CAG cell (CAG 1) and other 6 cells are non-CAG cell.

In an example, the wireless device may be authorized to use a CAG 1 and the SMF get the CAG 1 information during a session establishment procedure form a UDM or the AMF. The SMF may want to know whether the wireless device is an area of CAG 1 or out of the area of the CAG 1. In an example, the SMF may release/deactivate a PDU session of the wireless device in response to the wireless device being out of the area of CAG 1.

The SMF may send an event exposure subscribe message to the AMF, requesting to notify a change of CAG area. In an example, the event exposure subscribe message may comprise a CAG area information (e.g. CAG 1). In an example, the event exposure subscribe message may comprise a CAG area information which needs to be reported.

In an example, a PCF may request to the SMF to subscribe the event exposure of the change of the CAG area. In an example, the PCF may use the location information of the wireless device (e.g. the wireless device is inside of the area of CAG 1 or outside of the area of CAG 1). In an example, the PCF may apply different charging policy based on the CAG location information of the wireless device.

In an example, the AMF may send a location reporting control message to the first base station to request a configuration of a change of CAG area (e.g. CAG 1) reporting of the wireless device, in response to receiving the event exposure subscribe message comprising CAG 1. In an example, the location reporting control message may comprise CAG area information (e.g. CAG 1). In an example, the first base station may store the CAG 1 and may track a change of a location of the wireless device in response to receiving the location reporting control message. In an example, the first base station may send a location report message immediately in response to receiving the location reporting control message. In an example, the location reporting control message may comprise a UE identity, an event type, area of interest, location reporting id, and/or the like. In an example, the UE identity may comprise an AMF UE NGAP ID, RAN UE NGAP ID, and/or the like. The event type may be direct, change of serving cell, UE presence in the area of interest, stop change of serving cell, stop UE presence in the area of interest, cancel location reporting for the UE, and/or the like. In an example, the area of interest may be an area of interest representing as a list of tracking area identities, an area of interest representing as a list of cell identities, an area of interest representing as a list of base station identities, CAG identity, any CAG, any allowed identity, and/or the like.

The event type of the location reporting control message may be a UE presence in the area of interest. In an example, the area of interest may be CAG identity (e.g. CAG 1). The location reporting id may be the address of the SMF.

In an example, the wireless device moves from the cell 5 to cell 7. In an example, the first base station may have CAG information of the wireless device. The CAG information may comprise an allowed CAG list (e.g. CAG 1), CAG restriction indicator (e.g. the wireless device is allowed to access a non-CAG cell), and/or the like.

The first base station may perform an intra base station handover in response to the movement of the wireless device (based on measurement report from the wireless device) from the cell 5 to cell 7. In an example, the first base station may detect that the wireless device moves out from area of CAG 1 to non-CAG cell, in response to performing the handover. The first base station may send a location report message to the AMF in response to the detection of CAG area change.

In an example, the wireless device may not be allowed to access non-CAG cell. In this case the first base station may not able to perform an intra base station handover to the cell 7 (non-CAG cell). In this case, the first base may perform an RRC release procedure with the wireless device and may perform a UE context release procedure with the AMF. In an example, the first base station may send a UE context release request message comprising an appropriate cause value to the AMF. In an example, the appropriate cause value may indicate that a wireless device is not allowed to access a non-CAG cell. In an example, the AMF may detect a wireless device is out of CAG cell (CAG 1) in response to receiving the UE context release request message comprising the appropriate cause value (i.e. the wireless device is not allowed to access a non-CAG cell).

In an example, the location report may comprise UE identity, a user location information, a UE presence in area of interest list, location reporting request type, and/or the like. In an example the UE identity may comprise an AMF UE NGAP ID, RAN UE NGAP ID, and/or the like. In an example, the user location information may comprise E-UTRAN user location information, new radio (NR) user location information, N3IWF user location information, and/or the like. In an example, the E-UTRA user location information may comprise E-UTRA cell global identity, tracking area identity, age of location, and/or the like. In an example, the NR user location information may comprise NR cell global identity (CGI), tracking area identity, age of location, and/or the like. In an example, the N3IWF user location information may comprise IP address, port number, and/or the like. In an example, the UE presence in area of interest list may comprise list of a UE presence with corresponding location reporting reference id. In an example, the UE presence may indicate a location of a wireless device with the area of interest. The UE presence may comprise In, Out, Unknown, and/or the like. In an example, if the wireless device is placed inside of the area of interest, the UE presence may be IN. In an example, if the wireless device is placed in outside of the area of interest, the UE presence may be Out. In an example, the base station may not be able to aware/track a location of the wireless device based on the area of interest (e.g. the wireless device is in RRC-INACTIVE and the area of interest is inside of a registration area). If the base station is not able to aware a location of the wireless device, the UE presence may be Unknown.

The user location information from the first base station may comprise a CGI of the cell 7, a tracking area of the cell 7, age of location as zero, and/or the like. In an example, the UE presence in the UE presence in area of interest list (CAG 1) may be OUT.

In an example, the AMF may receive the location report message from the first base station. The location report message from the first base station may comprise CGI of the cell 7, a tracking area of the cell 7, age of location as zero, CAG 1: OUT, and/or the like.

In an example, the AMF may send an event exposure notify message to the SMF, notifying the change of the wireless device location out of area of CAG 1. In an example, the SMF may initiate a PDU session release procedure in response to receiving the event exposure notify message from the AMF.

Figure 23:
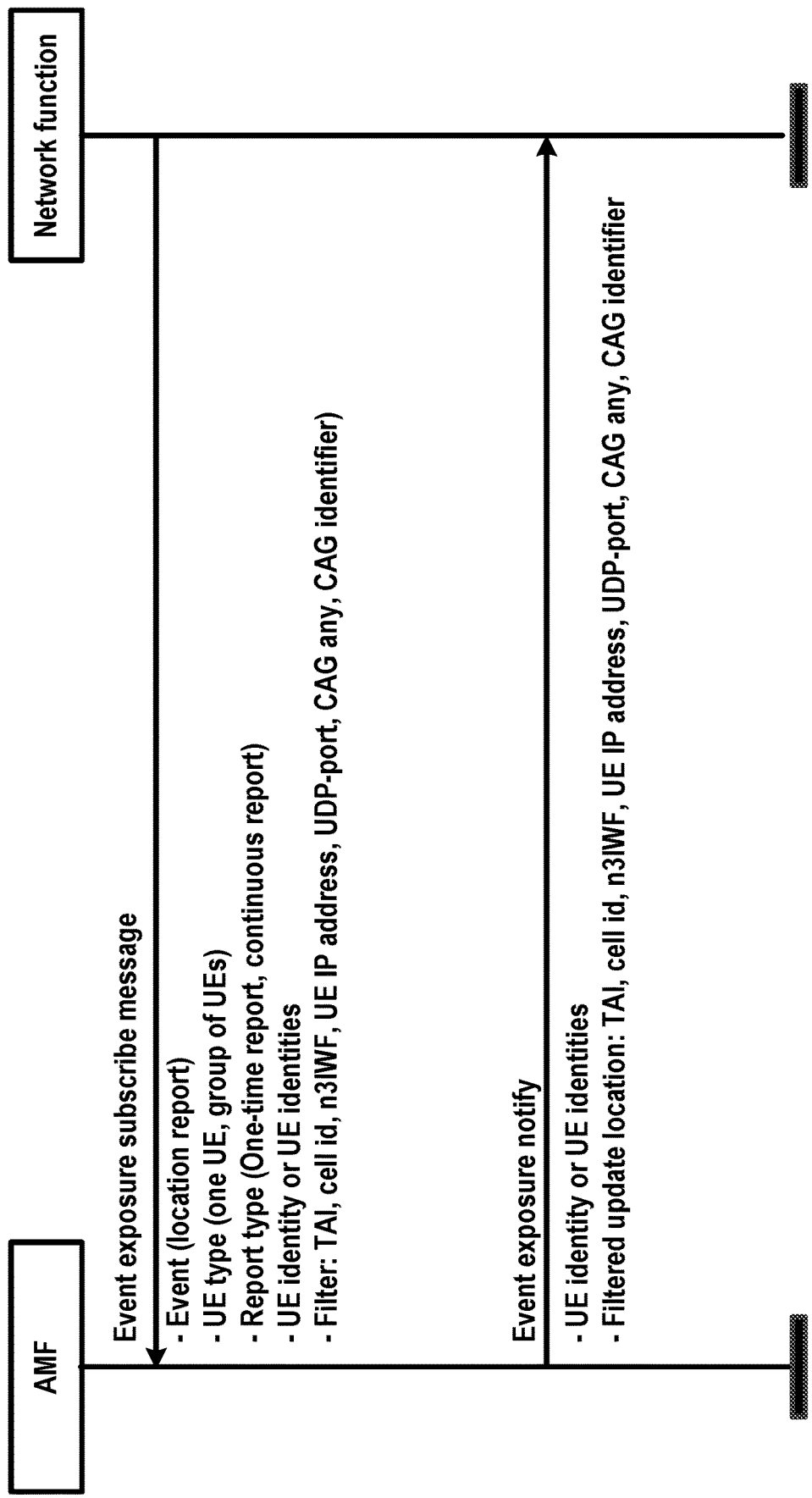
FIG. 23 is an example diagram of an aspect of an embodiment of the present disclosure.
Figure 24:
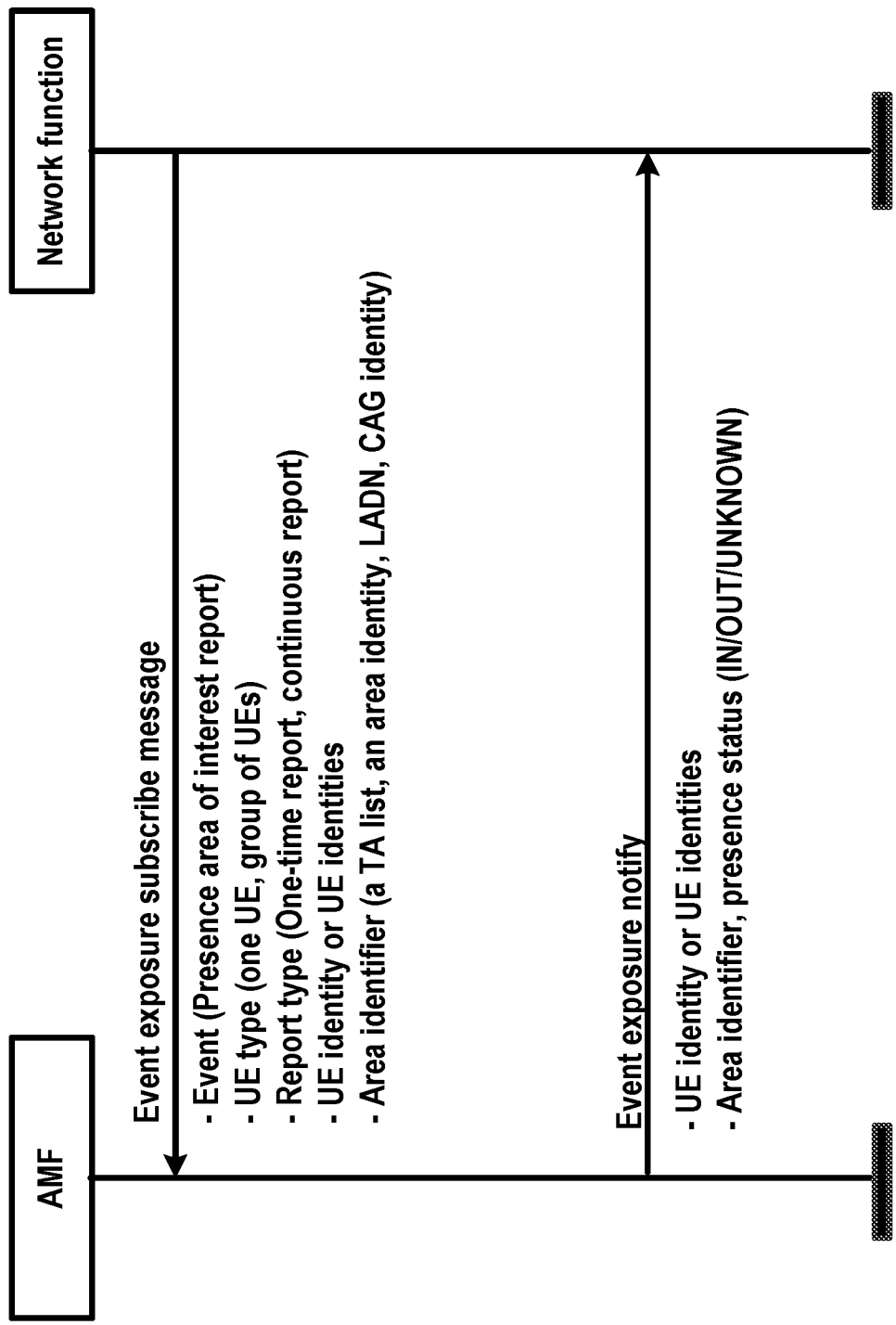
FIG. 24 is an example diagram of an aspect of an embodiment of the present disclosure.

FIG. 23 and FIG. 24 shows an event exposure subscribed procedure in accordance with embodiments of the present disclosure.

In an example, the event exposure subscribe message may be for a location report as depicted in FIG. 23. In this case the event exposure subscribe message may comprise at least one of an event types, a UE type, a report type, a UE identity or UE identities, filter, and/or the like. In an example, the event type may be a location report. In an example, the UE type may be one UE (e.g. wireless device) or group of UEs. In an example, the report type may be one-time report or continuous report. In an example, the UE identity may be a SUPI of the wireless device. In an example, the filter may comprise a tracking are identity, a cell identity, n3IWF, UE IP address, UDP-port, any CAG identifiers, allowed CAG identifiers of the wireless device, specific CAG identifier.

In an example, the filter may be any CAG identifiers. In this case, the AMF may send an event exposure notify message comprising all CAG identifiers of a cell at which the wireless device is located.

In an example, the filter may be allowed CAG identifiers of the wireless device. In this case, the AMF may send an event exposure notify message comprising CAG identifiers which belonging to CAG identifiers of a cell at which the wireless device is located and also belonging to allowed CAG identifiers of the wireless device.

In an example, the filter may be a specific CAG identifier (e.g. CAG 1). In this case, the AMF may send an event exposure notify message comprising whether the wireless device is a location of CAG 1 or not.

In an example, the event exposure notify message may further comprise a UE identity or UE identities.

If the report type is continuous report, the AMF may send the event exposure notify message whenever the AMF detects a change of the filer detection. In an example, the report type is continuous report and the filter is any CAG identifiers, the AMF may send the event exposure notify message whenever a set of CAG identifiers of the cell at which the wireless device located is changed. In an example, the report type is continuous report and the filter is a specific CAG identifier (e.g. CAG 1). The AMF may send the event exposure notify message whenever the wireless device leaves or enters the cell of the specific CAG identifier (e.g. CAG 1)

In an example, the event exposure subscribe message may be for a presence area of interest report as depicted in FIG. 24. In this case the event exposure subscribe message may comprise at least one of an event types, a UE type, a report type, a UE identity or UE identities, area identifier, and/or the like. In an example, the event type may be a Presence area of interest report. In an example, the UE type may be one UE (e.g. wireless device) or group of UEs. In an example, the report type may be one-time report or continuous report. In an example, the UE identity may be a SUPI of the wireless device. In an example, area identifier may comprise a tracking areas list, an area identity, local area data network (LADN), a specific CAG identify/identifiers, allowed CAG/non-allowed CAG/non-CAG, and/or the like.

In an example, the area identifier may be a specific CAG identifier. In this case, the AMF may send an event exposure notify message comprising the CAG identifier and presence status (IN/OUT/UNKNOWN) in response to detecting a change of the presence status of the area identifier. The AMF may detect the presence status based on a received location report message form a base station.

In an example, the area identifier may be allowed CAG/non-allowed CAG. In this case, the AMF may send an event exposure notify message based on the cell at which the wireless device is placed and the CAG information of the wireless device.

If the report type is continuous report, the AMF may send the event exposure notify message whenever the AMF detects a change of the location of the wireless device based on the interest of area of the area identifier.

Figure 25:
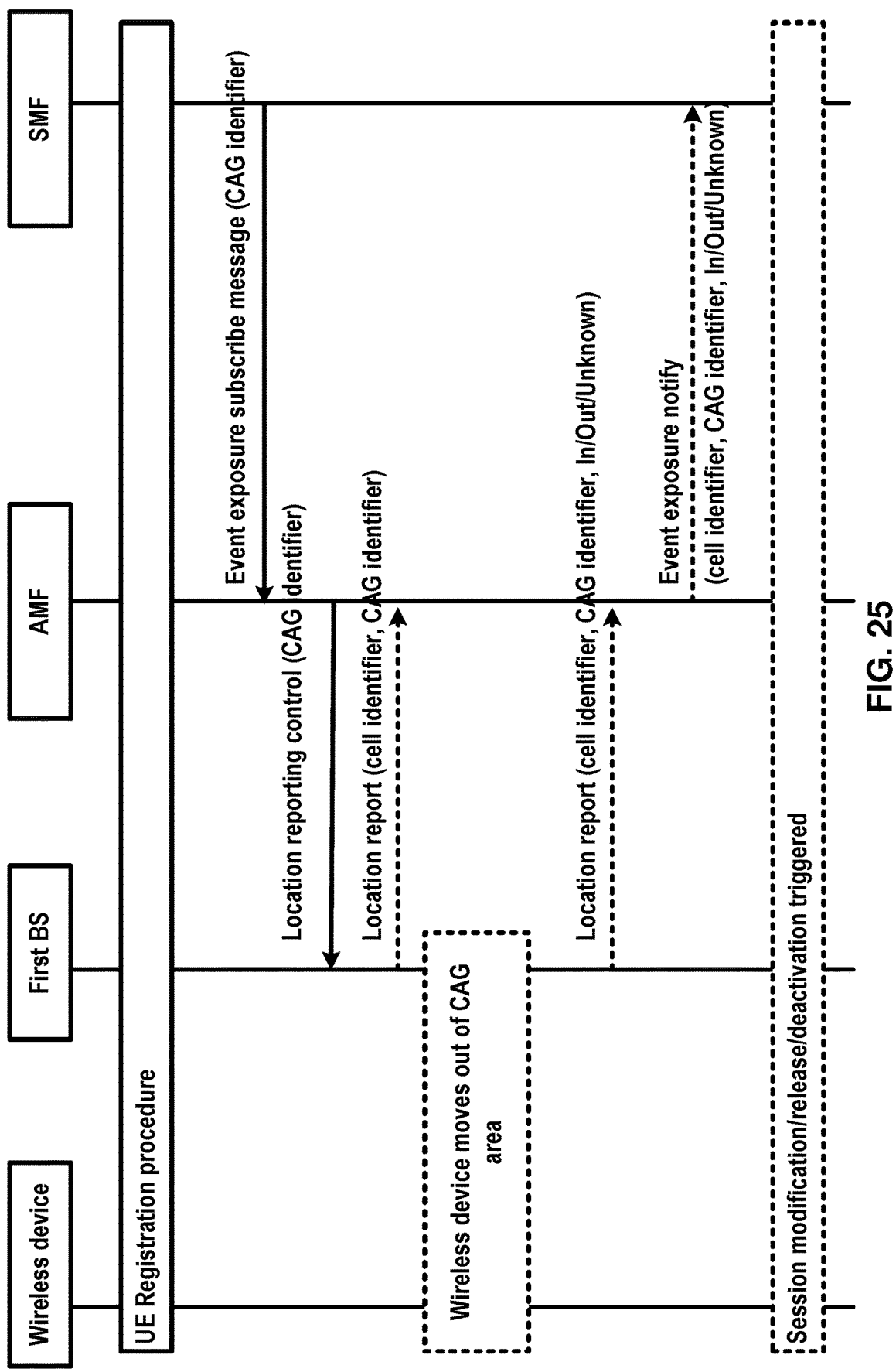
FIG. 25 is an example diagram of an aspect of an embodiment of the present disclosure.

FIG. 25 shows an example call flow between a wireless device, a first base station, an AMF and an SMF in accordance with embodiments of the present disclosure. In an example, the SMF may send an event subscribe message comprising CAG identifier (e.g. CAG 1) with an event type as Presence area of interest report to the AMF, requesting to notify a change of CAG area. The AMF may send a location reporting control message comprising a CAG identifier to the first base station, in response to receiving the event exposure subscribe message from the SMF. In an example, the first base station may store the information of the location reporting control message and may tracking a change of the wireless device location. In an example, if the first base station detects that the wireless device moves IN/OUT/UNKNOWN from the area of CAG 1 (e.g. a cell comprise/broadcasts CAG 1), the first base station may send a location report message to the AMF. In an example, the location report message may comprise a cell information (e.g. cell global identity, tracking area of the cell, age of the location information) and change of the area of interest (e.g. CAG identifier and corresponding presence status (IN/OUT/KNOWN)). In this case the change of CAG area may not require any mapping information between CAG area and list of cell identities. In an example, the first base station may know mapping information between the cell and supported list of CAG identifiers. In an example, the AMF may send an event exposure notify message to the SMF, in response to receiving the location report message from the first base station. In an example, the event exposure notify message may comprise a cell information of the first base station, a CAG identifier and corresponding presence status. In an example, the SMF may initiate a PDU session modification/release procedure base on the presence status of the wireless device.

Figure 26:
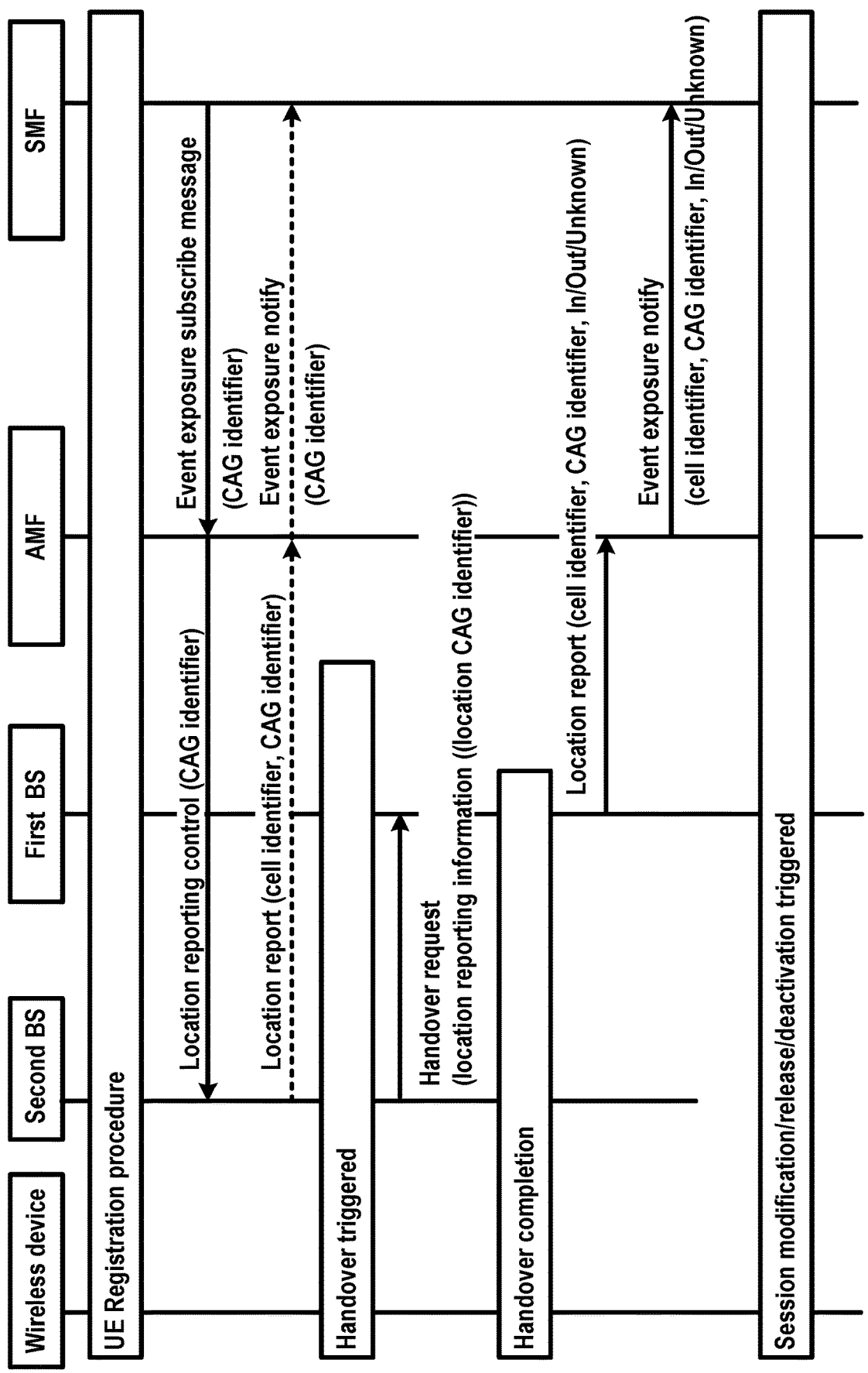
FIG. 26 is an example diagram of an aspect of an embodiment of the present disclosure.

FIG. 26 shows an example call flow between a wireless device, a first base station, a second base station, an AMF and an SMF in accordance with embodiments of the present disclosure. In an example, the SMF may send an event subscribe message comprising CAG identifier (e.g. CAG 1) with an event type as Presence area of interest report to the AMF, requesting to notify a change of CAG area. The AMF may send a location reporting control message comprising a CAG identifier to the second base station, in response to receiving the event exposure subscribe message from the SMF. In an example, the second base station may store the information of the location reporting control message and may tracking a change of the wireless device location. In an example, inter base station (e.g. gNB/eNB/NG-RAN) handover procedure may be triggered for the wireless device from the second base station to the first base station due to moving of the wireless device. In an example, the second base station and the first base station may belong to different CAG area.

In an example, the second base station may send a handover request message to the first base station. In an example, the handover request message may comprise a location reporting information comprising CAG identifier with an event type as Presence area of interest. In an example, the first base station may send a location report message to the AMF in response to completion the successful handover procedure and a detection of a change of CAG area based on the location reporting information in the Handover request message.

In an example, the second base station may be an area of CAG 1 and the first base station may be an area of non-CAG cell. In this case, the first base station may send a location report message to the AMF. In an example, the location report message may comprise a current cell information, CAG 1 with presence status as OUT. In an example, the location report message may further comprise a CAG information of current location. In an example, the current cell information may comprise a global cell identity of the wireless device, a tracking area of the cell, Non-CAG, and/or the like.

In an example, the second base station may be an area of CAG 1 and the first base station may be an area of CAG 2. In this case, the first base station may send a location report message to the AMF. In an example, the location report message may comprise a current cell information, CAG 1 with presence status as OUT. In an example, the location report message may further comprise a CAG information of current location. In an example, the current cell information may comprise a global cell identity of the wireless device, a tracking area of the cell, CAG 2, and/or the like.

In an example, the AMF may send an event exposure notify message to the SMF, in response to receiving the location report message from the first base station. In an example, the event exposure notify message may comprise a cell information of the first base station, a CAG identifier and corresponding presence status. In an example, the SMF may initiate a PDU session modification/release procedure base on the presence status of the wireless device.

Figure 27A:
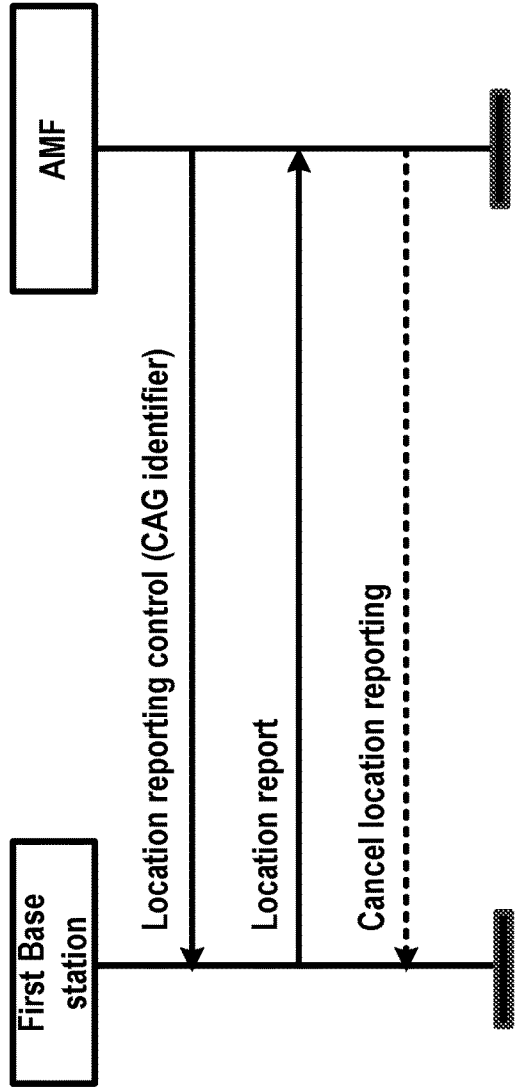
FIG. 27A is an example diagram of an aspect of an embodiment of the present disclosure.
Figure 27B:
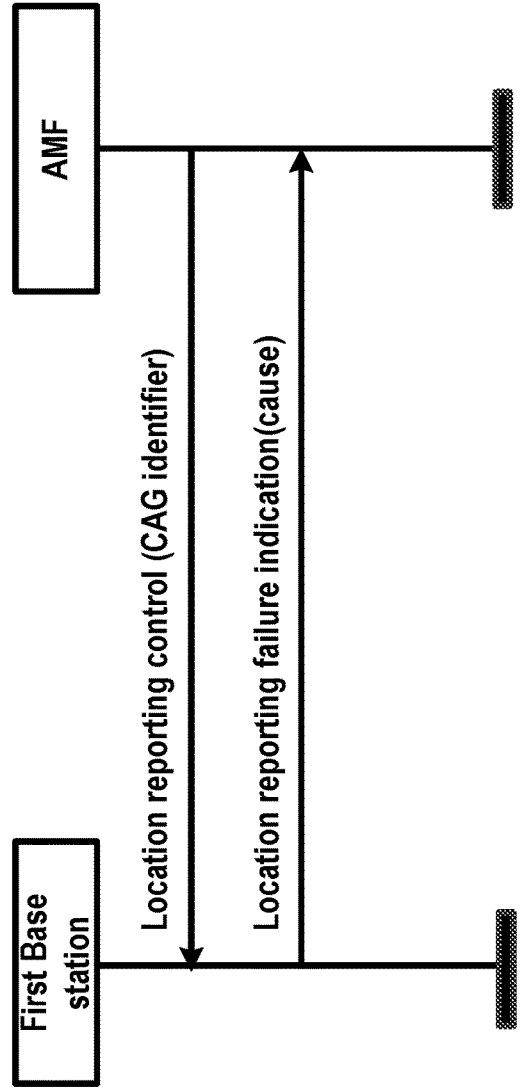
FIG. 27B is an example diagram of an aspect of an embodiment of the present disclosure.

FIG. 27A, FIG. 27B shows a location reporting procedure between a first base station and an AMF. FIG. 27A shows a successful case of the location reporting control procedure regarding the CAG and FIG. 27B show a failure case of the location reporting control procedure regarding the CAG.

Figure 28:
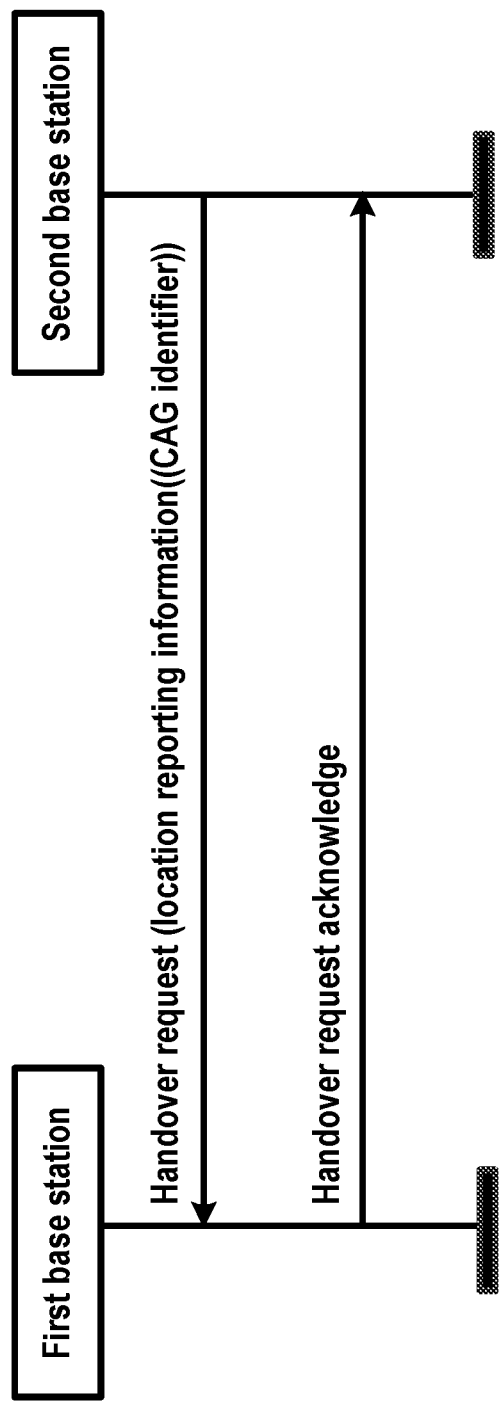
FIG. 28 is an example diagram of an aspect of an embodiment of the present disclosure.

FIG. 28 shows a handover procedure between a first base station and a second base station regarding a location reporting information exchange.

In an example, a CAG cell may be a hybrid cell. In an example, the hybrid cell may broadcast CAG identifier and is allowed to access to a non-member CAG wireless device. The wireless device may be member of the hybrid cell (e.g. the allowed CAG list of the wireless device may comprise the CAG identifier of the hybrid cell).

In an example, the mobility event by an AMF and NG-RAN location report by a base station may support hybrid cell. In case of hybrid cell, the location report message from a base station and the event exposure notify message by an AMF may comprise a hybrid information with member status of the wireless device.

In an example, a location reporting control to a base station may be ceased if the location reporting control is for a specific CAG identifier and the membership/verification of the wireless device for the specific CAG is expired. In an example, the base station may delete a location reporting control information stored in the base station, if the location reporting control is for a specific CAG identifier and the base station notified that a membership/verification for the specific CAG identifier is expired.

In an example, the event exposure subscription from a network function may be for a change of a CAG area. In an example, a membership/verification for a CAG identifier of the CAG area may be expired for a wireless device. In this case, an AMF may cancel any configured event exposure subscription for the CAG identifier of the wireless device. In an example, the AMF may inform the cancellation of the event subscription to the network function with an appropriated cause value that a membership/verification being expired.

In an example, a session management function (SMF) may send to an access and mobility management function (AMF), an event exposure subscribe message requesting to notify a change of closed subscribe group (CAG) area.

In an example, the SMF may receiving from the AMF an event exposure notify message, indicating a change of CAG area.

In an example, the SMF may determine to release/deactivate a packet data unit session of a wireless device based on the change of CAG area.

In an example, an access and mobility function (AMF) may receive from a network function, an event exposure subscribe message requesting to notify a change of closed access group (CAG) area/location.

In an example, the AMF may send to a first base station a location reporting control message configuring a change of CAG area of the wireless device, the location reporting control message comprising a list of CAG identifiers.

In an example, the AMF may receive from a second base station a location report message notifying of the change of CAG area, the location report message comprising a list of CAG identifiers with associated area result.

In an example, the AMF may send to the network function an event exposure notify message informing the change of CAG area.

In an example, the first base station may be the second base station.

In an example, the event exposure subscribe message may comprise at least one of, an event type, a UE type, a reporting type, a UE identity, a filter, an area identifier.

In an example, the event type may indicate at least one of a location reports, a presence in area of interest report, a time zone report, an access type report, a registration state report, a connectivity state report, a reachability report, a subscribed data report, a communication failure report, UEs in area report, and/or the like.

In an example, the UE type may indicate at least one of, one UE, group of UEs, and/or the like.

In an example, the reporting type may indicate at least one of one-time report, continuous report, and/or the like.

In an example, the filter may comprise at least one of tracking area, cell, none third generation interworking function (n3IWF), UE IP address, UDP port, any CAG identifier, CAG identifier(s), and/or the like.

In an example, the area identifier comprises at least one of a tracking area identity list, an area identity, a cell identity list, location area data network, CAG identity, and/or the like.

In an example, the event exposure notify message may comprise at least one of, UE identity, filtered update location, area identifier, a presence status, and/or the like.

In an example, the presence status indicates at least one of, in, out, unknown, and/or the like.

In an example, the network function comprises at least one of a session management function (SMF), a policy control function (PCF), a network exposure function (NEF), and/or the like.

In an example, the location reporting control message comprises at least one of a UE identity, an event type, an area of interest, a location reporting id, and/or the like.

In an example, the event type may indicate at least one of direct, a change of serving cell, a UE presence in the area of interest, stop change of serving cell, stop UE presence in the area of interest, cancel location reporting for the UE, and/or the like.

In an example, the area of interest may comprise at least one of a list of tracking area identities, an area of interest representing as a list of cell identities, an area of interest, representing as a list of base station identities, CAG identity, any CAG, any allowed CAG identity, and/or the like.

In an example, the location report message may comprise at least one of a cell information, change of the area of interest, presence status, and/or the like.

In an example, the cell information may comprise at least one of cell global identity, tracking area of the cell, age of the location information, supported CAG identities of the cell, and/or the like.

In an example, the presence status may comprise at least one of In, Out, Unknown, and/or the like.

In an example, the first base station may broadcast CAG identifiers.

In an example, the AMF may send to a user data management (UDM) function, a verification request message, in response to the event exposure subscribe message comprising the CAG identifier.

In an example, the AMF may send to the first base station, a location reporting control message, requesting a cancellation of the report, in response to an expiration of the CAG membership of the wireless device.

In an example, a first base station may receive from a network function, a location reporting control information element requesting a configuration of a change of closed access group (CAG) area report. In an example, the location reporting control information comprising a list of CAG identifiers.

In an example, the first base station may determine a change of CAG area based on the configuration.

In an example, the first base station may send to the AMF a location report message indicating the change of CAG area.

In an example, a first base station may receive from an access and mobility function (AMF), a location reporting control message requesting a configuration of a change of closed access group (CAG) area report.

In an example, the first base station may determine a change of CAG area based on the configuration of a change of CAG area report.

In an example, the first base station may send to the AMF a location report message indicating the change of CAG area.

In an example, the location reporting control message may comprise at least one of, an identification of the wireless device, a location reporting request type, and/or the like.

In an example, the identification of the wireless device comprises an AMF UE NGAP identity, a RAN UE NGAP identity, and/or the like.

In an example, the location reporting request type may comprise at least one of an event types, report area, one or more area of interest and associated location reporting reference identity associated with the area of interest, and/or the like.

According to various embodiments, a device such as, for example, a wireless device, a device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 29:
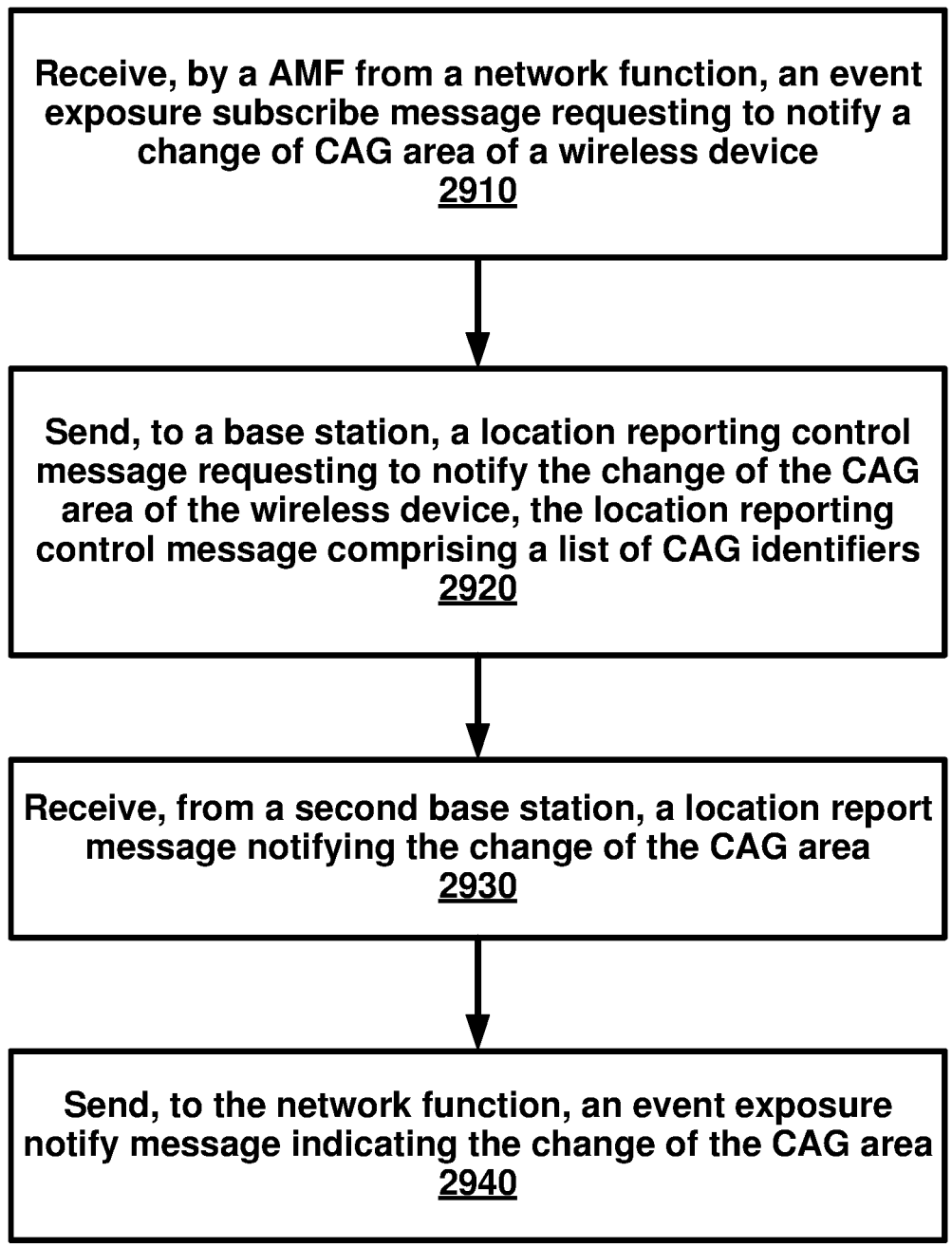
FIG. 29 is a flow diagram as per an aspect of an example embodiment of the present disclosure.

FIG. 29 is a flow diagram as per an aspect of an example embodiment of the present disclosure. At 2910, an access and mobility management function (AMF) may receive from a network function, an event exposure subscribe message requesting to notify a change of closed access group (CAG) area of a wireless device. At 2920, the AMF may send to a base station, a location reporting control message requesting to notify the change of the CAG area of the wireless device. The location reporting control message may comprise a list of CAG identifiers. At 2930, the AMF may receive from a second base station, a location report message notifying the change of the CAG area. At 2940, the AMF may send to the network function, an event exposure notify message indicating the change of the CAG area.

In an example embodiment, the first base station may be the second base station. The network function may be a session management function (SMF). The network function may be a policy control function (PCF). The network function may be a network exposure function (NEF). The base station may broadcast one or more CAG identifiers.

According to an embodiment, the event exposure subscribe message may comprise an event type. The event exposure subscribe message may comprise an event type. The event exposure subscribe message may comprise a user equipment type. The event exposure subscribe message may comprise a reporting type. The event exposure subscribe message may comprise a user equipment identity. The event exposure subscribe message may comprise a filter. The event exposure subscribe message may comprise an area identifier.

According to an embodiment, the filter may comprise a tracking area identity. The filter may comprise non third generation interworking function (n3IWF). The filter may comprise a user equipment internet protocol (IP) address. The filter may comprise a user datagram protocol (UDP) port. The filter may comprise one or more CAG identifiers.

The filter may comprise any CAG identifiers. The filter may comprise allowed CAG identifiers of the wireless device.

According to an embodiment, the area identifier may comprise tracking area identities list. The area identifier may comprise an area identity. The area identifier may comprise an area identity cell identities list. The area identifier may comprise an area identity a location area data network. The area identifier may comprise an area identity one or more CAG identities. The area identifier may comprise an area identity allowed CAG identifiers of the wireless device. The area identifier may comprise an area identity non-allowed CAG identifiers of the wireless device.

According to an embodiment, the location reporting control message may comprise a user equipment identity. The location reporting control message may comprise an event type. The location reporting control message may comprise an area of interest. The location reporting control message may comprise a location reporting identity.

According to an embodiment, the area of interest may comprise a list of tracking area identities. The area of interest may comprise a list of tracking area identities. The area of interest may comprise an area of interest representing as a list of cell identities. The area of interest may comprise an area of interest representing as a list of base station identities. The area of interest may comprise a CAG identity. The area of interest may comprise any CAG. The area of interest may comprise allowed CAG identities of the wireless device.

According to an embodiment, the location report message may comprise cell information. The location report message may comprise change of an area of interest. The location report message may comprise presence status. According to an embodiment, the cell information may comprise cell global identity. The cell information may comprise tracking area of the cell. The cell information may comprise age of location information. The cell information may comprise supported CAG identities of the cell. According to an embodiment, the presence status may comprise an in (the wireless device is inside the area for the location). The presence status may comprise an out (the wireless device is outside the area for the location). The presence status may comprise an unknown (it is unknown whether the wireless device is inside or outside the area for the location). According to an embodiment, the AMF may send to the base station, a second location reporting control message requesting a cancellation of the report. The sending may be based on an expiration of a CAG membership of the wireless device.

Figure 30:
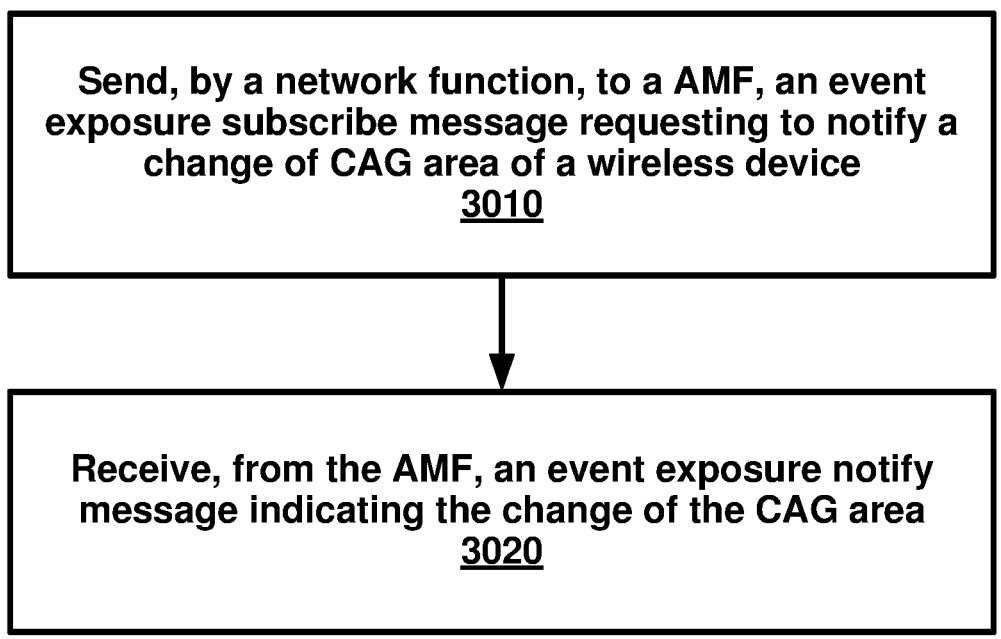
FIG. 30 is a flow diagram as per an aspect of an example embodiment of the present disclosure.

FIG. 30 is a flow diagram as per an aspect of an example embodiment of the present disclosure. At 3010, a network node may send to an AMF, an event exposure subscribe message requesting to notify a change of CAG area of a wireless device. At 3020, the network node may receive from the AMF, an event exposure notify message indicating the change of the CAG area. In an example, the network node may be a SMF. The SMF may use the event exposure notify message to handle a packet data unit (PDU) session. In an example, the network node may be a PCF. The PCF may use the event exposure notify message to handle a policy/charging for a wireless device or a PDU session of the wireless device.

Figure 31:
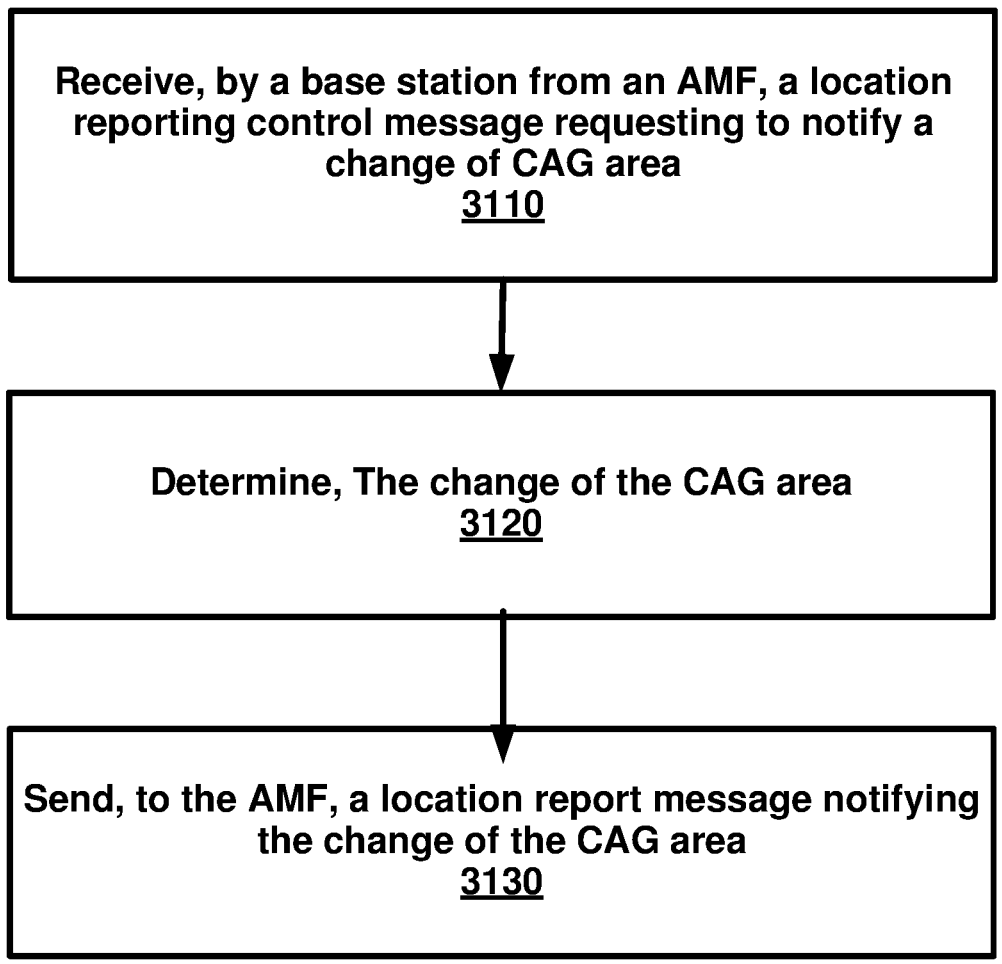
FIG. 31 is a flow diagram as per an aspect of an example embodiment of the present disclosure.

FIG. 31 is a flow diagram as per an aspect of an example embodiment of the present disclosure. At 3110, a base station may receive from an AMF, a location reporting control message requesting to notify a change of CAG area. At 3120, the base station may determine the change of the CAG area. The determination may be based on a movement (e.g., handover) of the wireless device. The determination may be based on a movement from a first CAG area to a second CAG area. The determination may be based on a movement from a CAG area to a non-CAG area. At 3130, the base station may send to the AMF, a location report message notifying the change of the CAG area.

In this specification, a and an and similar phrases are to be interpreted as at least one and one or more. In this specification, the term may is to be interpreted as may, for example. In other words, the term may is indicative that the phrase following the term may is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often employed in combination to achieve the result of a functional module.

Example embodiments of the invention may be implemented using various physical and/or virtual network elements, software defined networking, virtual network functions.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using 5G AN. However, one skilled in the art will recognize that embodiments of the invention may also be implemented in a system comprising one or more legacy systems or LTE. The disclosed methods and systems may be implemented in wireless or wireline systems. The features of various embodiments presented in this invention may be combined. One or many features (method or system) of one embodiment may be implemented in other embodiments. A limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language means for or step for be interpreted under 35 U.S.C. 112. Claims that do not expressly include the phrase means for or step for are not to be interpreted under 35 U.S.C. 112.

What is claimed is:

1. A method comprising:
   receiving, by an access and mobility management function (AMF) from a network function, an event exposure subscribe message requesting to notify a change of closed access group (CAG) area of a wireless device;
   sending, by the AMF to a base station, a location reporting control message requesting to notify the change of the CAG area of the wireless device, wherein the location reporting control message comprises a list of CAG identifiers;
   receiving, by the AMF from a second base station, a location report message notifying the change of the CAG area; and
   sending, by the AMF to the network function, an event exposure notify message indicating the change of the CAG area.

2. The method of claim 1, wherein the event exposure subscribe message comprises at least one of:
   an event type;
   a user equipment type;
   a reporting type;
   a user equipment identity;
   a filter; or
   an area identifier.

3. The method of claim 2, wherein the filter comprises at least one of:
   a tracking area identity;
   a cell identity;
   a non third generation interworking function (n3IWF);
   a user equipment internet protocol (IP) address;
   a user datagram protocol (UDP) port; or
   one or more CAG identifiers;
   any CAG identifiers; or
   allowed CAG identifiers of the wireless device.

4. The method of claim 2, wherein the area identifier comprises at least one of:
   a tracking area identities list;
   an area identity;
   a cell identities list;
   a location area data network;
   one or more CAG identities;
   allowed CAG identifiers of the wireless device; or
   non-allowed CAG identifiers of the wireless device.

5. The method of claim 1, wherein the location reporting control message comprises at least one of:
   a user equipment identity;
   an event type;
   an area of interest; or
   a location reporting identity.

6. The method of claim 5, wherein the area of interest comprises at least one of:
   a list of tracking area identities;
   an area of interest representing as a list of cell identities;
   an area of interest representing as a list of base station identities;
   a CAG identity;
   any CAG; or
   allowed CAG identities of the wireless device.

7. The method of claim 1, wherein the location report message comprises at least one of:
   a cell information;
   a change of an area of interest; or
   a presence status.

8. The method of claim 7, wherein the cell information comprises at least one of:
   a cell global identity;
   a tracking area of the cell;
   an age of location information; or
   supported CAG identities of the cell.

9. The method of claim 7, wherein the presence status comprises at least one of:
   in;
   out; or
   unknown.

10. The method of claim 1, further comprising sending, by the AMF to the base station, a second location reporting control message requesting a cancellation of an event exposure subscription, wherein the sending is based on an expiration of a CAG membership of the wireless device.

11. An access and mobility management function (AMF), comprising:
    one or more processors; and
    memory storing instructions that, when executed by the one or more processors, cause the AMF to:

receive, from a network function, an event exposure subscribe message requesting to notify a change of closed access group (CAG) area of a wireless device;

send, to a base station, a location reporting control message requesting to notify the change of the CAG area of the wireless device, wherein the location reporting control message comprises a list of CAG identifiers;

receive, from a second base station, a location report message notifying the change of the CAG area; and send, to the network function, an event exposure notify message indicating the change of the CAG area.

12. The AMF of claim 11, wherein the event exposure subscribe message comprises at least one of:
an event type;
a user equipment type;
a reporting type;
a user equipment identity;
a filter; or
an area identifier.

13. The AMF of claim 12, wherein the filter comprises at least one of:
a tracking area identity;
a cell identity;
a non third generation interworking function (n3IWF);
a user equipment internet protocol (IP) address;
a user datagram protocol (UDP) port; or
one or more CAG identifiers;
any CAG identifiers; or
allowed CAG identifiers of the wireless device.

14. The AMF of claim 12, wherein the area identifier comprises at least one of:
a tracking area identities list;
an area identity;
a cell identities list;
a location area data network;
one or more CAG identities;
allowed CAG identifiers of the wireless device; or
non-allowed CAG identifiers of the wireless device.

15. The AMF of claim 11, wherein the location reporting control message comprises at least one of:
a user equipment identity;
an event type;
an area of interest; or
a location reporting identity.

16. The AMF of claim 15, wherein the area of interest comprises at least one of:
a list of tracking area identities;
an area of interest representing as a list of cell identities;
an area of interest representing as a list of base station identities;
a CAG identity;
any CAG; or
allowed CAG identities of the wireless device.

17. The AMF of claim 11, wherein the location report message comprises at least one of:
a cell information;
a change of an area of interest; or
a presence status.

18. The AMF of claim 17, wherein the presence status comprises at least one of:
in;
out; or
unknown.

19. The AMF of claim 11, wherein the instructions further cause the AMF to send, to the base station, a second location reporting control message requesting a cancellation of an event exposure subscription, wherein the sending is based on an expiration of a CAG membership of the wireless device.

20. A system comprising:
a network function comprising:
one or more first processors; and
first memory storing instructions that, when executed by the one or more first processors, cause the network function to send, to an access and mobility management function (AMF), an event exposure subscribe message requesting to notify a change of closed access group (CAG) area of a wireless device; and the AMF, wherein the AMF comprises:
one or more second processors;
memory storing second instructions that, when executed by the one or more second processors, cause the AMF to:
receive, from the network function, the event exposure subscribe message;
send, to a base station, a location reporting control message requesting to notify the change of the CAG area of the wireless device, wherein the location reporting control message comprises a list of CAG identifiers;
receive, from a second base station, a location report message notifying the change of the CAG area; and
send, to the network function, an event exposure notify message indicating the change of the CAG area; and the base station, wherein the base station comprises:
one or more third processors;
memory storing third instructions that, when executed by the one or more third processors, cause the base station to:
receive, from the network function, the location reporting control message;
determine the change of CAG area; and
send, to the AMF, the location report.

* * * * *